United States Patent
Saito et al.

(10) Patent No.: US 9,180,702 B2
(45) Date of Patent: Nov. 10, 2015

(54) CYLINDRICAL SHAFT, TRANSPORT ROLLER, TRANSPORT UNIT AND PRINTING APPARATUS

(75) Inventors: Koichi Saito, Matsumoto (JP); Katsunori Ono, Shiojiri (JP); Kenji Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 818 days.

(21) Appl. No.: 12/704,459

(22) Filed: Feb. 11, 2010

(65) Prior Publication Data

US 2010/0209170 A1  Aug. 19, 2010

(30) Foreign Application Priority Data

Feb. 13, 2009 (JP) ................................ 2009-031834
Feb. 13, 2009 (JP) ................................ 2009-031835
Oct. 21, 2009 (JP) ................................ 2009-242233

(51) Int. Cl.
  *B41J 13/076* (2006.01)
  *B41J 13/02* (2006.01)
  *F16C 3/02* (2006.01)

(52) U.S. Cl.
  CPC ... *B41J 13/02* (2013.01); *F16C 3/02* (2013.01)

(58) Field of Classification Search
  CPC ............ B41J 13/076; B41J 13/02; F16C 3/02
  USPC ........... 101/375, 376, 402–404; 138/168–171
  See application file for complete search history.

(56) References Cited

U.S. PATENT DOCUMENTS

| | | | | |
|---|---|---|---|---|
| 556,819 A | * | 3/1896 | Hartman | 138/156 |
| 595,035 A | * | 12/1897 | Beranger et al. | 403/235 |
| 1,863,873 A | * | 6/1932 | Quarnstrom | 228/146 |
| 2,317,198 A | * | 4/1943 | Kasper | 72/51 |
| 2,362,817 A | * | 11/1944 | Haycock | 413/1 |
| 3,050,649 A | * | 8/1962 | Thomasko | 310/247 |
| 3,301,992 A | * | 1/1967 | Seeloff | 219/105 |
| 4,543,297 A | * | 9/1985 | Saurenman | 428/582 |
| 4,550,479 A | * | 11/1985 | Walter et al. | 29/898.066 |
| 4,907,626 A | * | 3/1990 | Mori | 138/156 |
| 5,829,354 A | * | 11/1998 | Buckley | 101/483 |

(Continued)

FOREIGN PATENT DOCUMENTS

| | | |
|---|---|---|
| JP | 07-119811 | 5/1995 |
| JP | 10-109777 | 4/1998 |

(Continued)

OTHER PUBLICATIONS

Certified Translation of Japanese unexamined published patent application No. JP 11-156461, published on Jun. 15, 1999.

*Primary Examiner* — David Banh
(74) *Attorney, Agent, or Firm* — Workman Nydegger

(57) ABSTRACT

A cylindrical shaft which is formed in a cylindrical shape by pressing process in a state in which a pair of ends are opposite to each other is disclosed. A joint is formed between the pair of ends, and includes a plurality of intersection portions extending in a direction intersecting with an axial direction of the cylindrical shaft, a first straight portion connecting the ends of one side each of the pair of adjacent intersection portions, and a second straight portion connecting the ends of the other sides of the pair of adjacent intersection portions and being shorter than the first straight portion. A distance between the pair of ends at the first straight portion is shorter than a distance between the pair of ends at the second straight portion.

18 Claims, 16 Drawing Sheets

(56) References Cited

U.S. PATENT DOCUMENTS

| | | | |
|---|---|---|---|
| 5,915,421 A * | 6/1999 | Borzym et al. | 138/142 |
| 6,016,846 A * | 1/2000 | Knittel et al. | 138/128 |
| 6,391,414 B1 * | 5/2002 | Hjertman et al. | 428/36.9 |
| 6,540,218 B2 | 4/2003 | Tsukada et al. | |
| 6,634,076 B2 * | 10/2003 | Hjertman et al. | 29/521 |
| 7,610,938 B2 | 11/2009 | Yanokura et al. | |
| 2004/0140011 A1 * | 7/2004 | Kondou et al. | 138/167 |
| 2007/0070113 A1 * | 3/2007 | Kawabata et al. | 347/20 |
| 2007/0131015 A1 * | 6/2007 | Matsumura et al. | 72/368 |
| 2008/0121008 A1 * | 5/2008 | Yanokura et al. | 72/199 |
| 2011/0214775 A1 * | 9/2011 | Yano | 138/171 |

FOREIGN PATENT DOCUMENTS

| | | |
|---|---|---|
| JP | 11-156461 | 6/1999 |
| JP | 2006-289496 | 10/2006 |
| JP | 2007-203342 | 6/2007 |
| JP | 2008-068977 | 3/2008 |

\* cited by examiner

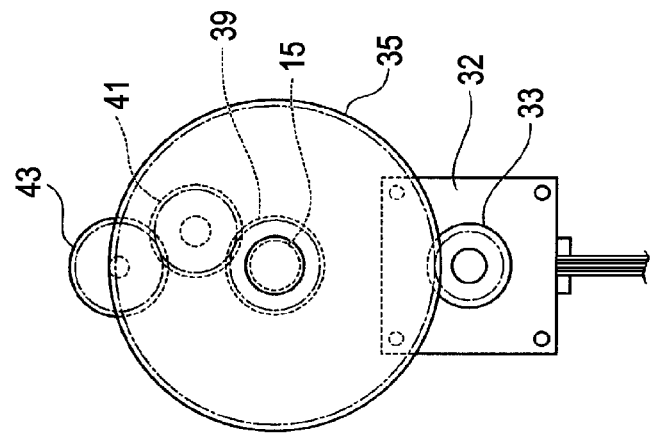
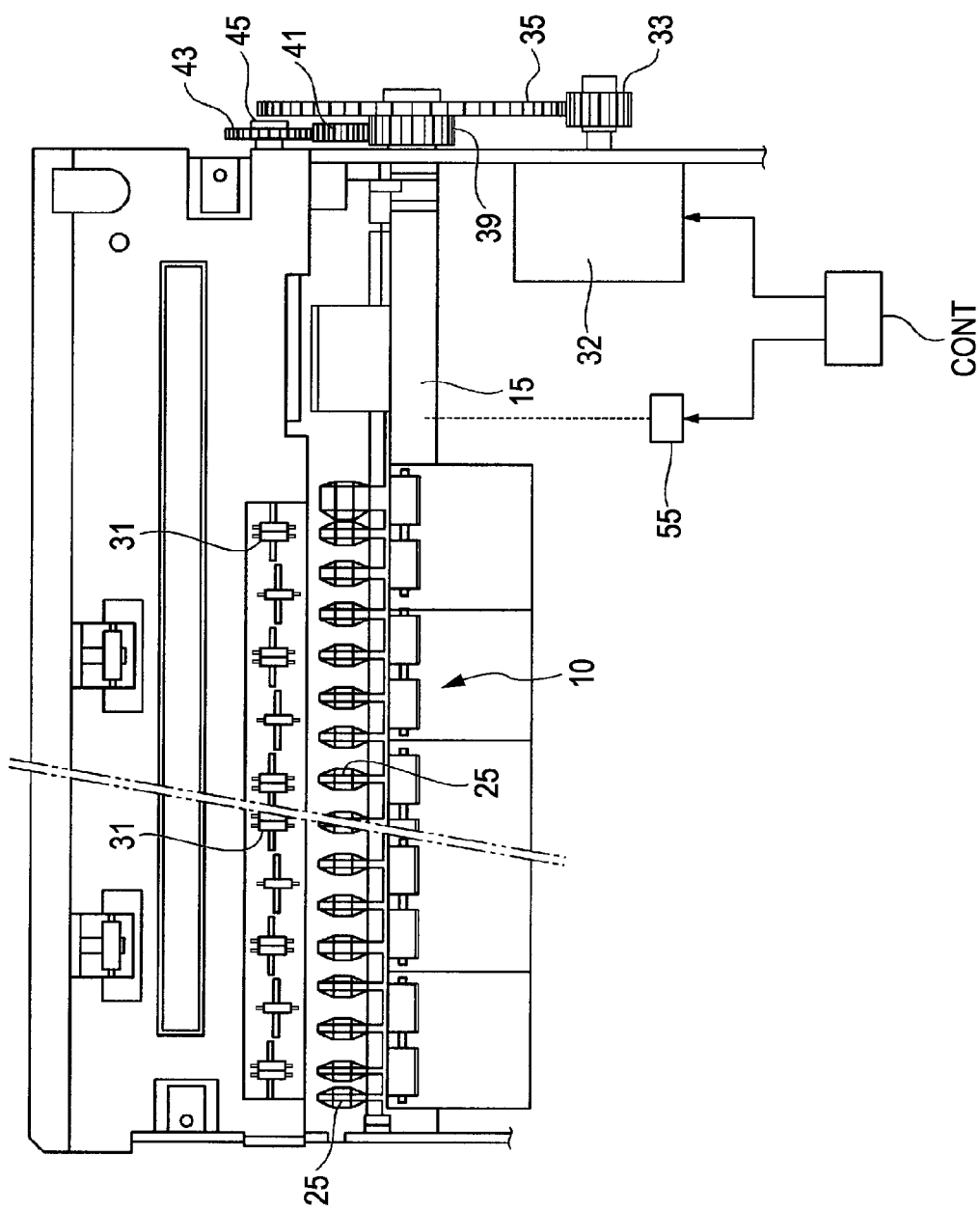

CYLINDRICAL SHAFT, TRANSPORT ROLLER, TRANSPORT UNIT AND PRINTING APPARATUS

CROSS-REFERENCE TO RELATED APPLICATIONS

This application claims the benefit of priority to Japanese Patent Application No. 2009-031834 filed Feb. 13, 2009, Japanese Patent Application No. 2009-031835 filed Feb. 13, 2009, and Japanese Patent Application No. 2009-242233 filed Oct. 21, 2009, the contents of which are hereby incorporated by reference in their entirety.

BACKGROUND

1. Technical Field

The present invention relates to a cylindrical shaft, a transport roller, a transport unit and a printing apparatus.

2. Related Art

Up to now, various printers have been provided as a printing apparatus. Such printers are adapted to transport a recording medium, such as paper or the like, to a printing unit by a transport roller (a paper feed roller) and a driven roller, print the recoding medium, and then eject the recording medium by a paper ejection roller (a driving roller) and a driven roller (a knurled roller).

In this printer, the paper is pinched between the transport roller and the driven roller, and if the transport roller is rotated in that state, the paper is moved in a sub-scanning direction perpendicular to a moving direction of a carriage. Accordingly, the paper is transported to a recording position with high precision, and is sequentially sent according to printing speed. Therefore, high transport power is required.

In order to enable the transport roller to sustain high frictional force, Japanese Patent No. 3,271,048 discloses a technique of forming a plurality of bosses on a circumference of a metal rod by perforation processing.

However, since the bosses are formed on the surface of a shaft shape (a cylindrical column shape) along a circumferential direction, there is a problem in that the workability is bad. Further, there is another problem in that cost is increased due to the use of a solid material.

Under these circumstances, JP-A-2006-289496 discloses a shaft (a cylindrical shaft) of a cylindrical shape (a hollow shape) formed by bending a metal sheet which is used as a solid metal rod member, for the purpose of cost reduction.

That is, the cylindrical shaft formed by a metal sheet, of which a pair of opposite ends are joined, is provided in JP-A-2006-289496, each end including a convex portion protruding from the end and having a portion of which a width is widened as it becomes more distant from the end, as well as a concave portion depressed from the end and having a portion of which a width is widened as it becomes more distant from the end. The convex portion and the concave portion of the end at one side are fitted to the concave portion and the convex portion of the end at the other side.

However, in the case in which the cylindrical shaft, as shown in JP-A-2006-289496, is applied to a transport roller in order to promote reduction in cost or weight, it is difficult to provide the transport roller with high frictional force.

For example, it is considered that the surface is punched by pressing process to form the bosses shown in Japanese Patent No. 3,271,048; however, there is a problem in this case in that it is likely to deform because of the hollow.

Further, in the cylindrical shaft disclosed in JP-A-2006-289496, the pair of opposite ends are provided with the convex portions and the concave portions which are formed along the entire region (the whole length) in a longitudinal direction thereof, the convex portion and the concave portion of the pair of ends being respectively fitted into each other. That is, a joint between the pair of ends is provided with a fitting portion of the convex portion and the concave portion continuously formed over the entire region (the whole length) in a longitudinal direction thereof.

However, if the fitting portion by a concavity and a convexity is formed on the entire region or partial region of the joint, it is difficult to fit the concave-convex portion at the fitting portion as the design. For example, it is difficult to place a leading end of the convex portion near the corresponding concave portion in plane, without unevenness between the convex portion and the concave portion. As a result, deformation or distortion is likely to occur over the entire cylindrical shaft, and it is difficult to obtain good precision regarding the shape or dimension, for example to obtain circularity or tremor of above a predetermined value.

As described above, if the cylindrical shaft having insufficient precision regarding the shape or dimensions is applied to the transport roller, it plays a role in causing transport irregularity. Further, in a so-called ink jet printer which ejects fin droplets to form an image, since it requires very high paper feeding precision, the occurrence of the transport irregularity becomes an especially significant problem.

SUMMARY

An advantage of some aspects of the invention is that it provides a cylindrical shaft having good precision regarding the shape or dimension and achieving reduction in cost and weight, a transport roller which can suppress transport irregularity, and a transport unit and a printing apparatus using the transport roller.

According to one aspect of the invention, there is provided a cylindrical shaft which is formed in a cylindrical shape by pressing process in a state in which a pair of ends are opposite to each other, the cylindrical shaft including: a joint formed between the pair of ends, the joint including a plurality of intersection portions extending in a direction intersecting with an axial direction of the cylindrical shaft, a first straight portion connecting the ends of one side each of the pair of adjacent intersection portions, and a second straight portion connecting the ends of the other sides of the pair of adjacent intersection portions and being shorter than the first straight portion, in which a distance between the pair of ends at the first straight portion is shorter than a distance between the pair of ends at the second straight portion.

According to the cylindrical shaft, since the distance between the pair of ends at the first straight portion of the bent portion is shorter than the distance between the pair of ends at the second straight portion, the precision regarding the shape or dimensions of the cylindrical shaft can be increased.

That is, in the bent portion, the end of one side constituting the second straight portion becomes a convex portion of which the pair of adjacent intersection portions and the second straight portion connecting the ends thereof form an outer shape of the convex portion. As a result, when the convex portion is placed near or abuts on the opposite end by pressing the metal sheet, a leading end side of the convex portion is not sufficiently bent in a circumferential shape, so that it ascends outwardly with respect to the opposite end. Therefore, a stepped portion is formed on the second straight portion. Due to the stepped portion, the obtained cylindrical shaft is likely to deform, and the appropriate precision regarding the shape or the dimensions can be hard to obtain.

Consequently, the distance between the ends of the second straight portion is set to be longer than the distance between the ends of the first straight portion which is formed to be longer than the second straight portion. As a result, the ascending of the leading end of the convex portion is reduced, thereby suppressing the stepped portion from being formed on the second straight portion. That is, by suppressing the stepped portion from being formed on the second straight portion, it is possible to suppress the deformation of the cylindrical shaft caused by the stepped portion, thereby increasing the precision regarding the shape or the dimensions.

Further, in the cylindrical shaft, it is preferable that the intersection portion is extended in a direction substantially perpendicular to a center axis of the cylindrical shaft.

With the above description, at the time of the pressing process, the opposite ends at the intersection portion can be placed near or abut on each other with relatively high precision.

According to another aspect of the invention, there is provided a cylindrical shaft which is formed in a cylindrical shape by pressing process in a state in which a pair of ends are opposite to each other, the cylindrical shaft including: a joint formed between the pair of ends, the joint including a center straight portion installed at a center portion of the cylindrical shaft in an axial direction, and formed in a straight shape substantially parallel with the axial direction of the cylindrical shaft; a plurality of intersection portions installed at both sides of the center portion, and extending in a direction intersecting with the axial direction of the cylindrical shaft; a first straight portion connecting the ends of one side each of the pair of adjacent intersection portions; and a second straight portion connecting the ends of the other sides of the pair of intersection portions, and being shorter than the first straight portion, in which a distance between the pair of ends at the center portion is shorter than a distance between the pair of ends at the second straight portion.

According to the cylindrical shaft, since the joint formed between the pair of ends is provided with a center portion in the axial direction of the cylindrical shaft which is formed in a straight shape which is substantially parallel with the axial direction of the cylindrical shaft, and the bent portions are formed at both ends of the center straight portion formed in the straight shape, there is no fitting of a concavity and a convexity of the center straight portion of the joint. For this reason, as compared with the case in which a fitting portion by the concavity and the convexity is formed over the entire length of the joint, deformation or distortion hardly occur on the cylindrical shaft, thereby easily obtaining the high precision regarding the shape or the dimensions, such as circularity or tremor.

Further, since the distance between the pair of ends at the center portion is shorter than the distance between the pair of ends at the second straight portion, the precision regarding the shape or dimensions of the cylindrical shaft can be increased.

That is, in the bent portion, the end of one side constituting the second straight portion becomes a convex portion of which the pair of adjacent intersection portions and the second straight portion connecting the ends thereof form an outer shape of the convex portion. As a result, when the convex portion is placed near or abuts on the opposite end by pressing process, a leading end side of the convex portion is not sufficiently bent in a circumferential shape, so that it ascends outwardly with respect to the opposite end. Therefore, a stepped portion is formed on the second straight portion. Due to the stepped portion, the obtained cylindrical shaft is likely to deform, and the appropriate precision regarding the shape or the dimensions can be hard to obtained.

Consequently, the distance between the ends of the second straight portion is set to be longer than the distance between the center straight portion. As a result, the ascending of the leading end of the convex portion is reduced, thereby suppressing the stepped portion from being formed on the second straight portion. That is, by suppressing the stepped portion from being formed on the second straight portion, it is possible to suppress the deformation of the cylindrical shaft caused by the stepped portion, thereby increasing the precision regarding the shape or the dimensions.

Further, since the first straight portion is formed to be longer than the second straight portion, at the time of the pressing process, the ends which are opposite to each other over the entire length of the joint can be placed near or abut on each other with relatively high precision.

In addition, in the cylindrical shaft, it is preferable that the first straight portion is formed on the same straight line as the center straight portion.

With the above description, the opposite ends of the first straight portion and the center straight portion can be placed near each other with high precision.

In the cylindrical shaft, the second straight portion may be formed on a straight line different from the center straight portion.

In addition, in the cylindrical shaft, it is preferable that the joint is formed in such a way that the distance between the pair of opposite ends at the second straight portion is longer than the distance between the pair of opposite ends at the first straight portion.

For example, since the distance between the pair of ends of the first straight portion is equal to the distance between the pair of opposite ends of the center straight portion, the pressing process can be easily performed, so that the precision regarding the shape or dimensions of the obtained cylindrical shaft is improved and the deformation is suppressed.

In addition, it is preferable that in the cylindrical shaft, the intersection portion is extended in a direction substantially perpendicular to a center axis of the cylindrical shaft.

With the above description, at the time of the pressing process, the opposite ends of the intersection portion can be placed near or abut on each other with relatively high precision.

According to another aspect of the invention, there is provided a transport roller including: the above-described cylindrical shaft; and a high-frictional layer installed on a surface of the cylindrical shaft, and containing inorganic particles.

With the transport roller, the cylindrical shaft formed in a cylindrical shape by pressing process is used, thereby achieving the reduction in cost and weight as compared with the case of using a solid rod member. Further, the good transport power can be exercised by installing the high-frictional layer containing the inorganic particles on the surface of the cylindrical shaft.

Further, since the precision regarding the shape or dimensions of the cylindrical shaft is further increased, as described above, the transport irregularity due to the insufficient precision can be suppressed.

In addition, it is preferable that, in the transport roller, the high-frictional layer is installed at least at a region which abuts against a medium transported by the transport roller.

With the above description, since the high-frictional layer is installed at the region which abuts against the medium, it is possible to minimize the material cost of the high-frictional layer.

According to another aspect of the invention, there is provided a transport roller including: the above-described cylindrical shaft; and a high-frictional layer installed on a surface of the cylindrical shaft, and containing inorganic particles, in which the high-frictional layer is installed at least at a region corresponding to the center straight portion.

Generally, both ends of the cylindrical shaft having the transport roller are portions for attaching a coupling member of a driving system such as a gear, and the portion directly abutting against the recording medium such as paper becomes a center portion of the cylindrical shaft. Consequently, since the high-frictional layer is installed at the center portion of the cylindrical shaft, that is, the region corresponding to the center straight portion, the material cost of the high-frictional layer can be minimized.

According to another aspect of the invention, there is provided a transport unit including the above-described transport roller; a driven roller that is driven by the transport roller; and a driving device that rotatably drives the transport roller.

With the above transport unit, it is possible to achieve the reduction in the cost and weight, as described above. Further, since it includes the transport roller capable of suppressing the transport irregularity, it is possible to achieve the reduction in the cost and weight of the transport unit itself, and the transportability of the recording medium by the transport roller is excellent.

In addition, it is preferable that in the transport unit, a surface of the driven roller is subjected to a low-wear treatment.

With the above description, it is possible to suppress damage from being applied to the driven roller by the abutting of the transport roller, in particular, the abutting of the high-frictional layer.

In addition, it is preferable that in the transport unit, the driven roller is positioned at a position which abuts against the high-frictional layer of the transport roller.

With the above description, since the force pinching the recoding medium, such as paper, between the transport roller and the driven roller is increased, thereby further increasing the transportability of the recording medium.

According to another aspect of the invention, there is provided a printing apparatus including: the above-described transport unit; a printing unit that prints a recording medium transported by the transport unit; and a control unit that controls the printing of the printing unit.

With the printing apparatus, since it includes the transport unit, it is possible to achieve the reduction in the cost and weight, and to appropriately transport the recording medium.

BRIEF DESCRIPTION OF THE DRAWINGS

The invention will be described with reference to the accompanying drawings, wherein like numbers reference like elements.

FIG. 2A is a plan view of a transport unit, and FIG. 2B is a side elevational view of a driving system.

DESCRIPTION OF EXEMPLARY EMBODIMENTS

Now, the invention will be described in detail with reference to the accompanying drawings. In each figure used in the description below, the scale of the respective members is appropriately changed in order to give the respective members a size enabling comprehension.

First, a printing apparatus including a transport roller according to the invention will now be described with reference to FIGS. 1, 2A and 2B.

Figure 1:
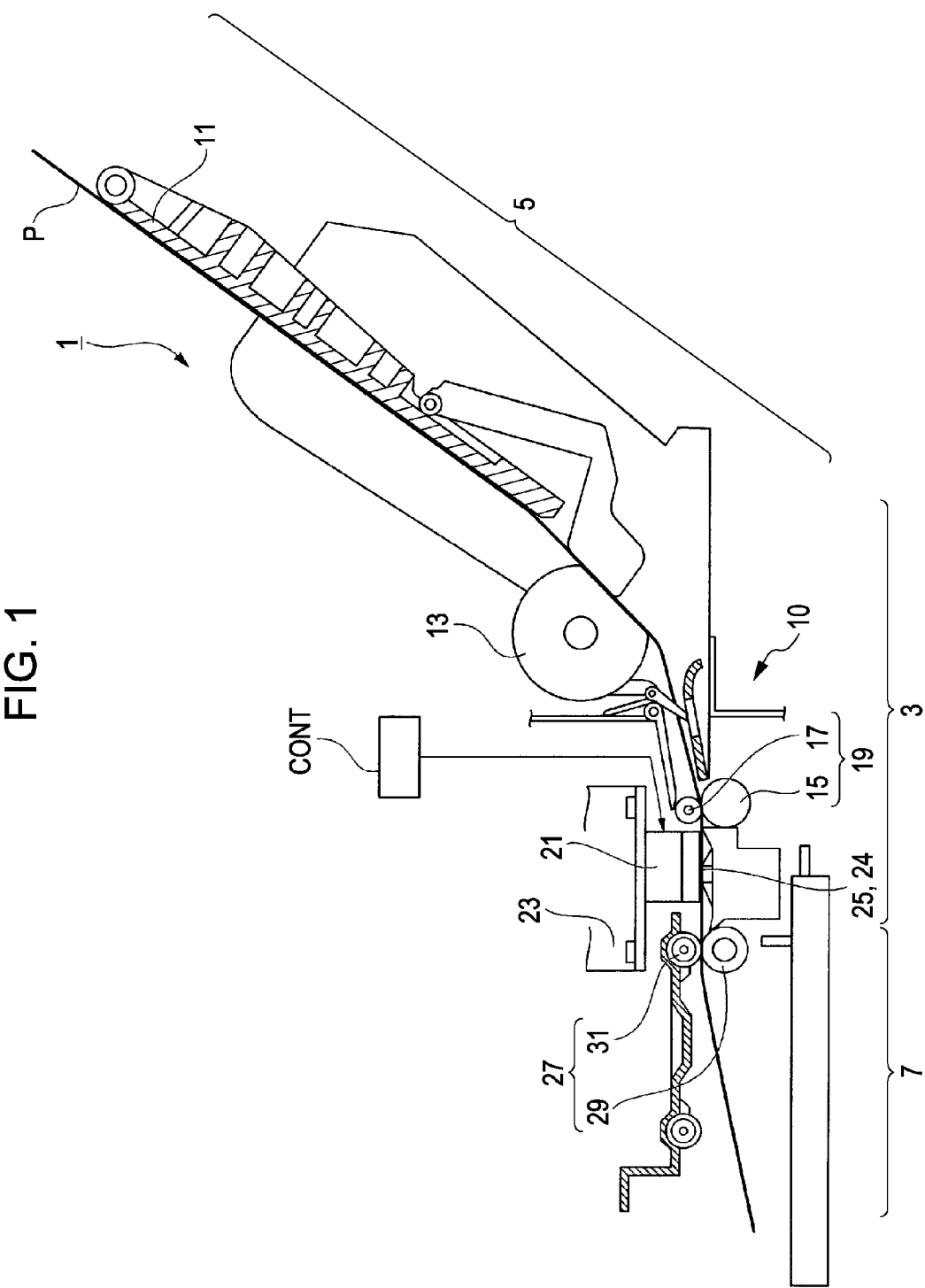
FIG. 1 is a cross-sectional view of an ink jet printer according to the invention.

FIG. 1 is a cross-sectional view of the printing apparatus (an ink jet printer) including a transport unit according to the invention. FIG. 2A is a plan view of the transport unit of the printing apparatus, and FIG. 2B is a side elevational view of a driving system of the printing apparatus.

FIG. 1 shows an ink jet printer 1 according to an embodiment of the printing apparatus of the invention. The ink jet printer 1 includes a printer body 3, a paper feeding unit 5 installed on an upper portion of the printer body 3 at its rear side, and a paper ejection unit 7 provided at a front side of the printer body 3.

The paper feeding unit 5 is provided with a paper feed tray 11, and plural sheets of paper (recording medium) P are stacked in the paper feed tray 11. Here, the paper P includes regular paper, coat paper, OHP (Overhead Projector) sheet, calendered paper, gloss film and so forth.

The paper feed tray 11 is provided at a downstream side thereof with a paper feed roller 13. The paper feed roller 13 is adapted to discharge the paper P forwardly by pinching the uppermost paper P in the paper feed tray 11 between the paper feed roller and a separation pad (not shown) opposite to the paper feed roller.

The discharged paper P reaches a transport roller mechanism 19 constituted by a transport roller 15 disposed at a lower side, and a driven roller 17 disposed at an upper side. The transport roller 15 is an example of the transport roller according to the invention, as described below.

Further, the transport unit 10 is constituted by the transport roller 15, the driven roller 17, and a driving device that drives the transport roller 15 rotatably.

The paper P reached the transport roller mechanism 19 is transported to a print head (a printing unit) 21 positioned at a downstream side of the transport roller mechanism 19, while being subjected to the precise and accurate transport (paper feeding) operation associated with the print processing by the rotation of the transport roller 15.

The print head 21 is supported on the carriage 23, and the carriage 23 is adapted to reciprocate in a direction perpendicular to a paper feed direction (a transport direction of the paper P).

A platen 24 is installed at a position opposite to the print head 21. The platen 24 includes a plurality of diamond ribs 25 spaced apart from each other in a moving direction of the carriage 23.

The diamond ribs 25 support the paper P at the lower side when the paper P is printed by the print head 21. More specifically, the top surface of the diamond rib 25 serves as a support surface.

In this instance, the print processing by the print head 21 is controlled by a control unit CONT.

The distance between the print head 21 and the diamond rib 25 can be adjusted depending upon a thickness of the paper P, and, in this way, the paper P smoothly passes over the top surface of the diamond rib 25, and thus is printed with high quality.

the paper P printed by the print head 21 is sequentially discharged by a paper ejection roller 29 installed to the paper ejection unit 7.

A paper ejection roller mechanism 27 includes a paper ejection roller 29 disposed at the lower side, and a paper ejection knurled roller 31 disposed at the upper side, and draws and discharges the paper P by the rotation of the paper ejection roller 29.

Here, in the transport roller mechanism 19 and the paper ejection roller mechanism 27, the driving systems of the transport roller 15 and the paper ejection roller 29, and a relationship of driving speed of both rollers 15 and 29 will now be described.

The printer body 3 is provided with a transport motor (a driving device) 32 that is driven under control of the above-described control unit CONT, as shown in FIGS. 2A and 2B.

A pinion 33 is installed to a driving shaft of the transport motor 32, and a transport driving gear 35 is meshed with the pinion 33. The above-described transport roller 15 is interposed and connected to the transport driving gear 35. In this configuration, the transport motor 32 is a driving device for rotating the transport roller 15.

Further, the transport roller 15 is provided with an inner gear 39 installed on the same shaft as the transport driving gear 35. The inner gear 39 is meshed with an intermediate gear 41, and the intermediate gear 41 is meshed with a paper ejection driving gear 43.

A rotation shaft of the paper ejection driving gear 43 forms a shaft body 45 of the paper ejection roller 29, as shown in FIG. 2A. In this configuration, the transport roller 15 of the transport roller mechanism 19 and the paper ejection roller 29 of the paper ejection roller mechanism 27 receive a rotational driving force from the transport motor 32 which serves as the same driving source, and thus are driven by the force.

In this instance, the rotational speed of the paper feed roller 29 is set to be faster than the rotational speed of the transport roller 15 by adjusting a gear ratio of each gear described above. Consequently, the paper ejection speed of the paper ejection roller mechanism 27 is set to be faster by an increase rate s than the transport speed of the transport roller mechanism 19.

Further, a pinch force (pressing force) of the transport roller mechanism 19 with respect to the paper P is set to be larger than a pinch force (pressing force) of the paper ejection roller mechanism 27. Consequently, when the transport roller mechanism 19 and the paper ejection roller mechanism 27 pinch the paper P, the transport speed of the paper is defined as the transport speed of the transport roller mechanism 19, irrespective of the paper ejection speed of the paper ejection roller mechanism 27.

Now, the transport roller mechanism 19 including the transport roller 15 according to the invention will be described.

Figure 3:
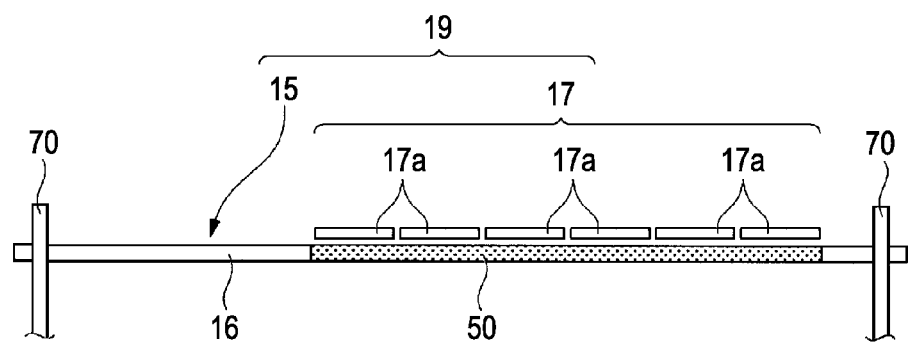
FIG. 3 is a view schematically showing the configuration of a transport roller mechanism.

FIG. 3 is a view illustrating the schematic configuration of the transport roller mechanism 19 including the transport roller 15 and the driven roller 17.

The transport roller 15 includes a roller body 16 made by pressing a metal plate such as zinc-coated steel sheet or stainless steel sheet and formed in a cylindrical shape, and a high-frictional layer 50 installed on the surface of the roller body 16. Here, the roller body 16 is one example of a cylindrical shaft in the invention.

Further, the transport roller 15 is rotatably supported by a bearing 70 at both leading end sides thereof. In particular, an end of the side connected to the above-described inner gear 39 and the transport driving gear 35 is provided with an engaging portion (not shown) which is unrotatably engaged with the inner gear 39 and the transport driving gear 35.

Since the transport roller 15 is connected to various connecting components, the transport roller 15 can be provided with various kinds of engaging portions, as described below. Further, the high-frictional layer 50 is selectively formed at the center portion in this example, except for both ends of the roller body 16.

The driven roller 17 includes a plurality (e.g., 6) of rollers 17a which are arranged in the coaxial direction, and is disposed at a position which faces the high-frictional layer 50 of the transport roller 15 and abuts against the high-frictional layer 50. A pressing spring (not shown) is attached to the driven roller 17 constituted by the rollers 17a. In this way, the driven roller 17 is pressed toward the transport roller 15 side. As a result, the driven roller 17 is placed near the high-frictional layer 50 of the transport roller 15 with a predetermined pressing force (a pinching force with respect to the paper P), and thus is rotated according to the rotational operation of the transport roller 15.

In addition, as the force pinching the paper P between the transport roller 15 and the driven roller 17 is increased, the transportability of the paper P is further enhanced. In this instance, the surface of the respective roller 17a of the driven roller 17 is subjected to low-wear treatment, for example, fluororesin coating, in order to reduce damage due to sliding contact with the high-frictional layer 50.

The above-described roller body (cylindrical shaft) 16 is formed by pressing a metal sheet in such a way that a pair of facing ends (end faces) are placed near or abut on each other to form a cylindrical shape. Consequently, the roller body 16 has a joint formed between the pair of ends. The joint is provided with a gap which is formed by the pair of ends (the end faces) slightly spaced apart from each other.

First Embodiment of a Transport Roller 15

A Roller Body 16

Now, as the detailed description of the first embodiment of the transport roller 15 (the roller body 16), the detailed structure and a manufacturing method thereof will be described with reference to FIGS. 4 to 12.

Figure 4A:
FIG. 4A and FIG. 4B are plan views showing a metal plate serving as a substrate of a roller body according to a first embodiment.

In order to manufacture the transport roller 15, first, a large metal sheet (a first metal sheet) 65 of a rectangular shape or strap shape is prepared, as shown in FIG. 4A. For example, a zinc-coated metal sheet having a thickness of approximately 1 mm is used as the large metal sheet 65.

Figure 4B:
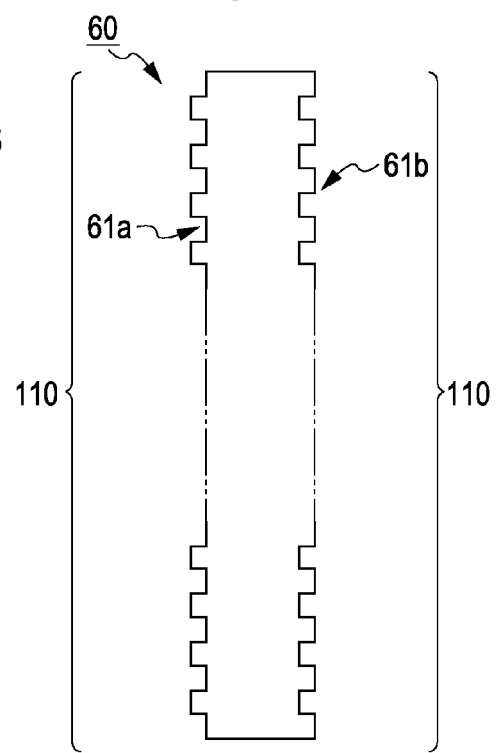

Next, the large metal sheet 65 is cut by a pressing process to form a metal sheet (a second metal sheet) 60 in the shape of a substantially elongated rectangular plate corresponding to the roller body 16, as shown in FIG. 4B, that is, the metal sheet 60 which serves as a substrate of the roller body 16.

However, when the large metal sheet 65 is subjected to the pressing process, in order to form a bent portion of a rectangular waveform at the above-described joint formed between the pair of ends at the same time of the above-described cutting operation, a concave-convex portion 110 of a rectangular waveform is formed at the entire regions of the pair of opposite ends 61a and 61b in the longitudinal direction which are long sides.

In this instance, since the pair of long sides (the ends 61a and 61b) are placed near or abut on each other by the pressing process, in the case in which the concave-convex portion 110 of one long side of the corresponding (opposite) portions is a convex portion, the concave-convex portion 110 of the other long side is a concave portion. Otherwise, in the case in which the concave-convex portion 110 of one long side is the concave portion, the concave-convex portion 110 of the other long side is the convex portion in a longitudinal direction.

In addition, in the formation of the metal sheet 60, when the pair of long sides (the ends 61a and 61b) are moved toward each other each other by the pressing process, the distance of the gap formed in the joint formed between the ends, that is, the distance of the opposite ends (the end surfaces) is designed to have a size in such a way that the distance between the portions is set as a relation as described below. The pressing process is performed based on the relation.

Next, as shown in the process view of pressing process of FIGS. 5A to 5C and 6A to 6C, the metal sheet 60 is pressed to have a cylindrical shape (a pipe shape), and the ends 61a and 61b of both sides (the long sides) are placed near or abut on each other.

Figure 5A:
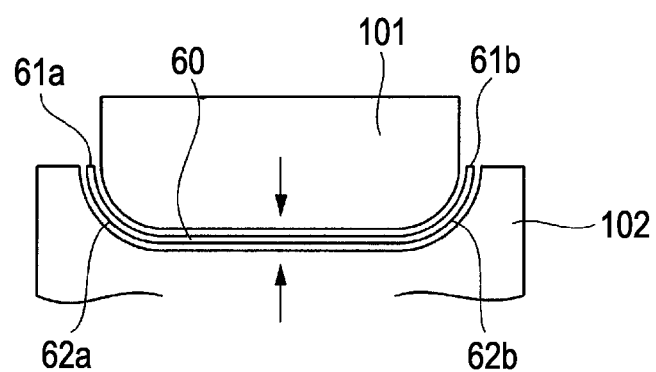
FIGS. 5A to 5C are process views illustrating pressing process of a metal plate.

That is, first, the metal sheet 60 is pressed by using a male mold 101 and a female mold 102 shown in FIG. 5A to bend both sides 62a and 62b of the metal sheet 60 in a circular arc shape (preferably, approximately a quarter circular arc).

In this instance, FIG. 5A shows the metal sheet 60, the male mold 101 and the female mold 102 in the state in which the metal sheet 60, the male mold 101 and the female mold 102 are spaced apart from each other at an interval, in order to easily understand each parts, but the interval does not exist in real. The metal sheet 60, the male mold 101 and the female mold 102 are closely contacted with each other at each of the contacted portions. This is similar to the cases shown in FIGS. 5B and 5C and FIGS. 6A to 6C.

Figure 5B:
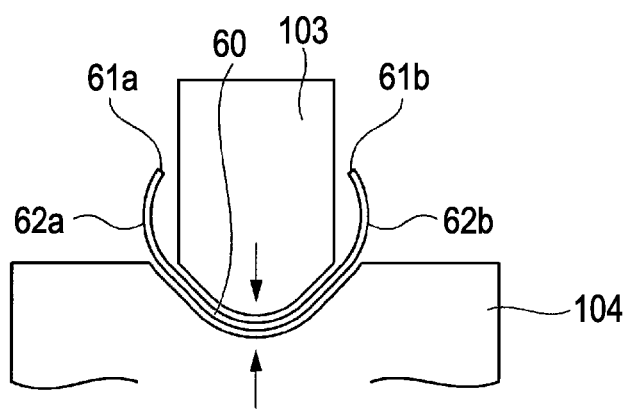

The center portion of the metal sheet 60, in a widthwise direction (a bending direction), obtained in FIG. 5A is pressed by a male mold 103 and a female mold 104 shown in FIG. 5B to bend it in a circular arc shape (preferably, approximately a quarter circular arc).

Figure 5C:
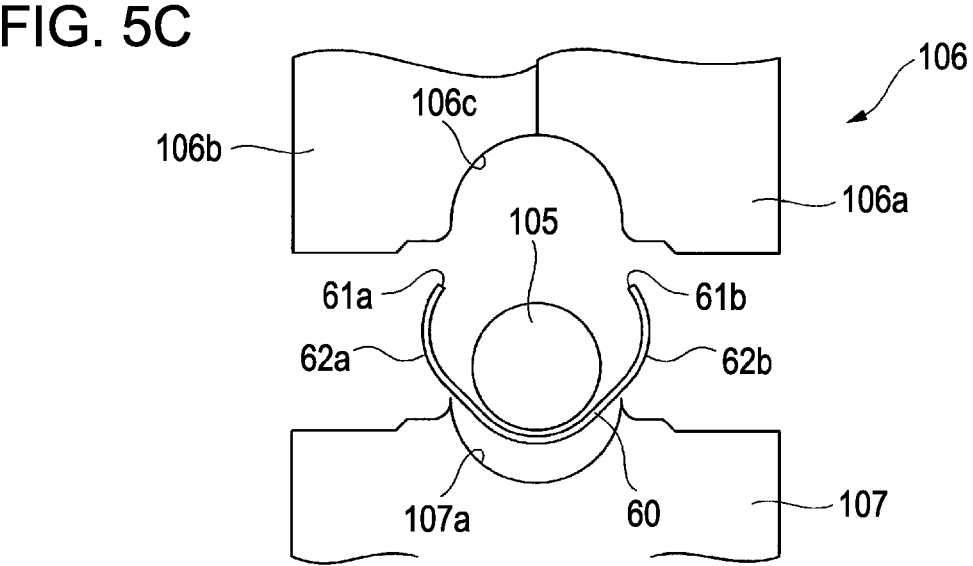
Figure 6A:
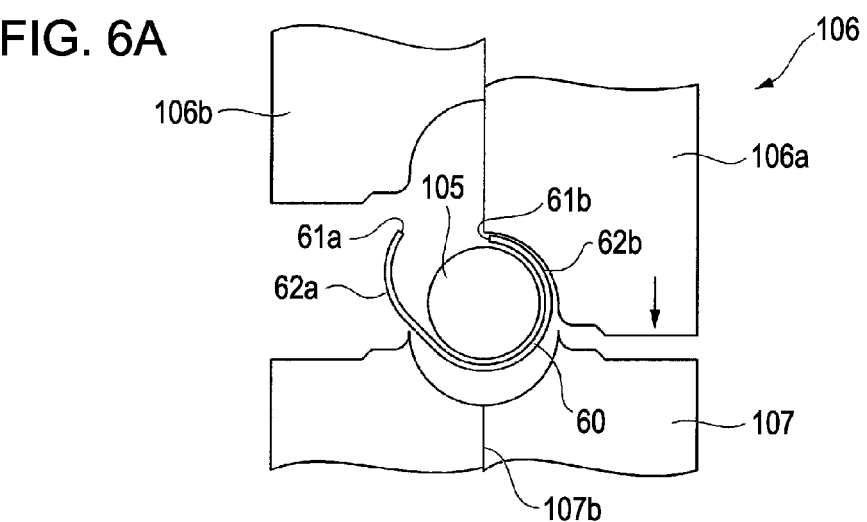
FIGS. 6A to 6C are process views illustrating pressing process of a metal plate.
Figure 6B:
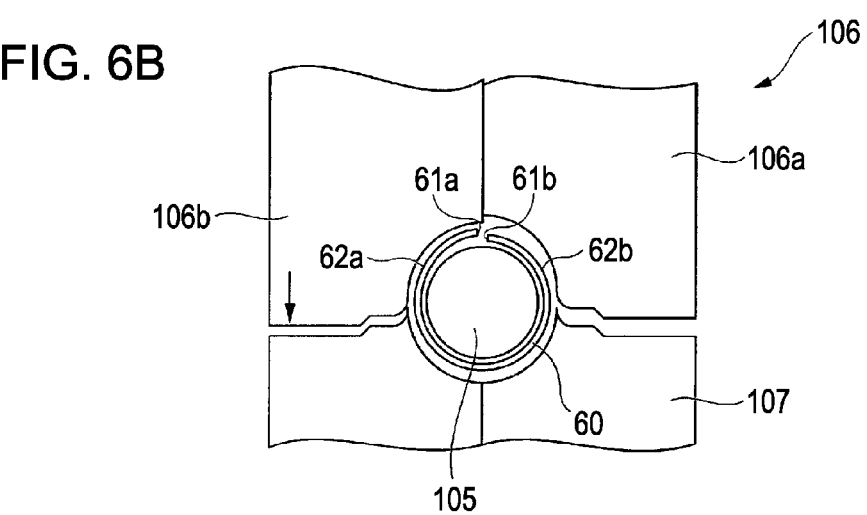
Figure 6C:
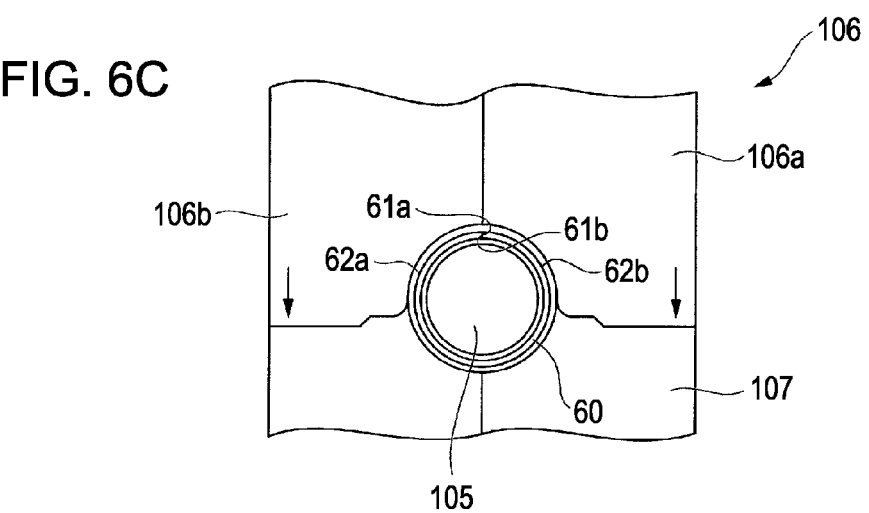

Then, as shown in FIG. 5C, a core mold 105 is disposed in the metal sheet 60 obtained in FIG. 5B, and, as shown in FIGS. 6A to 6C, the end surfaces (the ends) 61a and 61b of both sides 62a and 62b of the metal sheet 60 are moved toward each other by using an upper mold 106 and a lower mold 107 shown in FIG. 5C.

Here, the outer diameter of the core mold 105 shown in FIG. 5C and FIGS. 6A to 6C is identical to the inner diameter of a cylindrical hollow pipe to be formed. Further, a radius of a press surface 106c of the upper mold 106 and a radius of a press surface 107a of the lower mold 107 are identical to a radius of an outer diameter of the hollow pipe to be formed, respectively. In addition, as shown in FIGS. 6A to 6C, the upper mold 106 is constituted by a pair of right and left segmented molds, and the segmented molds 106a and 106b can be independently lifted and lowered.

That is, as shown in FIG. 6A, one side of the metal sheet 60 is pressed by relatively lowering (hereinafter, in similar ways, movement of the mold means relative movement) the right segmented mold 106a with respect to the lower mold 107 from the state shown in FIG. 5C, thereby bending the metal sheet in a substantially semicircular shape. In this instance, the lower mold 107 can be constituted by a pair of right and left segmented molds (see a segmented surface 107b), similar to the upper mold 106, and at the time of processing shown in FIG. 6A, the lower mold of the same side can be lifted.

Next, as shown in FIG. 6B, the segmented mold 106a is slightly lowered (to the extent of that the end 61a of one side and the end 61b of the other side are adjacent to each other), and simultaneously, the other segmented mold 106b is lowered, thereby pressing the other side of the metal sheet 60 bent in a substantially semi-circular shape.

After that, as shown in FIG. 6C, the core mold 105 and the upper mold 106 (the segmented mold 106a and 106b) are lowered to form the cylindrical hollow pipe (the roller body 16). In this instance, the ends 61a and 61b of the right and left sides are sufficiently placed near each other, with a gap being therebetween, or partially abut on each other. That is, in the cylindrical hollow pipe, the joint is formed between both ends 61a and 61b by moving both ends 61a and 61b of the metal sheet 60 which serves as a substrate to each other or abutting the ends. Consequently, the joint is generally provided with a gap, since both ends 61a and 61b are slightly spaced apart from each other.

Next, in order to increase circularity of the formed hollow pipe (the roller body 16) and reduce a tremor in the embodiment, the outer circumference of the above-described hollow pipe (the roller body 16) is polished by a centerless polishing processing known in the art.

In this way, the hollow pipe becomes the roller body 16 having good circularity and small tremor, that is, a cylindrical shaft according to the invention, as compared with those prior to the centerless polishing processing. Further, as the gap between both ends 61a and 61b is further narrowed in the roller body (cylindrical shaft) 16, as shown in FIG. 7, the joint 80, in which the gap between both ends 61a and 61b is more narrowed, is formed.

In this instance, in the pressing process or the centerless polishing processing, it is preferable that there is not gap between both ends 61a and 61b of the metal sheet 60, that is, both ends 61a and 61b abut on each other.

However, it is very difficult to completely eliminate the gap, while maintaining the circularity and tremor amount of the obtained hollow pipe (the roller body 16) properly. Consequently, a certain level of gap is formed under the circumstances.

Figure 7:
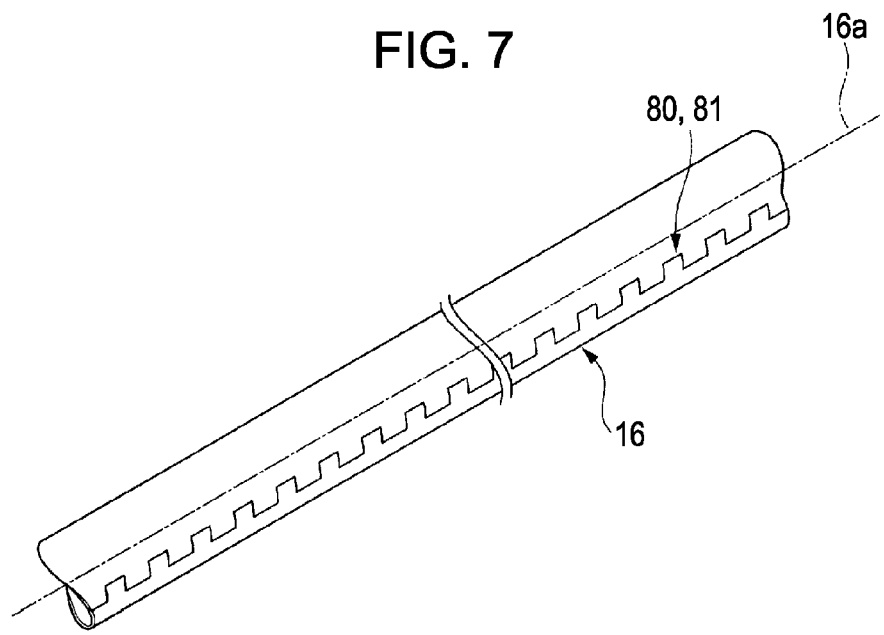
FIG. 7 is a perspective view of the roller body according to the first embodiment.

The joint 80 formed by this way is provided with a bent portion 81 of a rectangular waveform formed over the entire length of the roller body 16, as shown in FIG. 7, by fitting of the concave-convex portion 110 shown in FIG. 4B.

Figure 8:
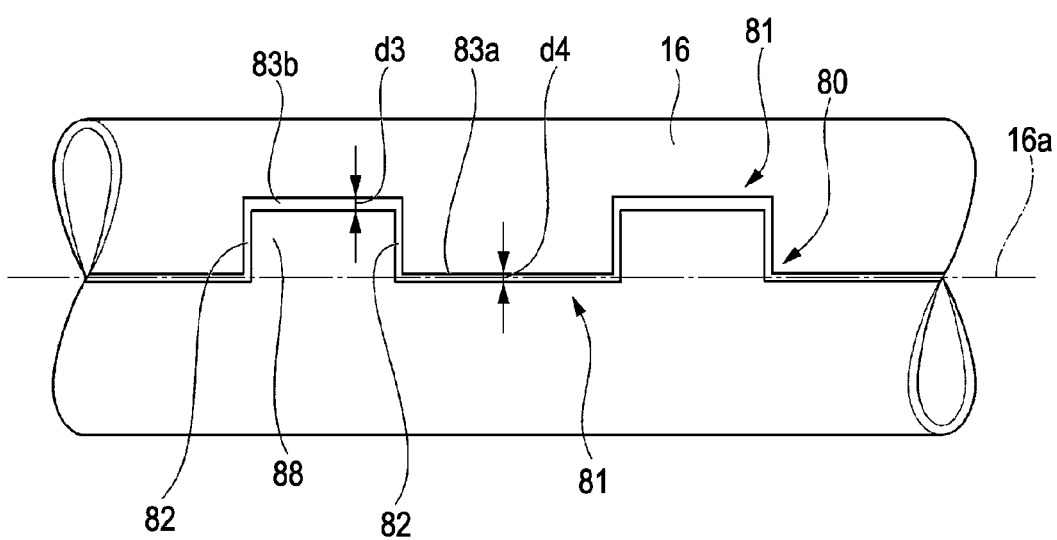
FIG. 8 is a view illustrating a shape of a joint of the roller body according to the first embodiment.

The bent portion 81 (the joint 80) is constituted by a plurality of intersection portions 82 intersecting at a central axis 16*a* of the roller body (cylindrical shaft) 16, a first straight portion 83*a* connecting the ends of one side each of the pair of adjacent intersection portions 82 and 82, and a second straight portion 83*b* connecting the ends of the other sides, as shown in FIG. 8.

Here, the first straight portion 83*a* and the second straight portion 83*b* are formed substantially in parallel with the central axis 16*a* of the roller body 16, and the intersection portion 82 is formed to be in perpendicular to the first straight portion 83*a* and the second straight portion 83*b*, that is, to be substantially perpendicular to the central axis of the roller body 16. Further, the second straight portion 83*b* is formed to be shorter than that of the first straight portion 83*a*.

A distance d3 between a pair of opposite ends of the roller body (cylindrical shaft) 16, in particular, the second straight portion 83*b*, is formed to be longer than a distance d4 between a pair of opposite ends of the first straight portion 83*a*. In this instance, the term "the distances d3 and d4 between the pair of ends" means the distance between the ends in the gap formed on the outer circumference of the roller body 16.

This will increase the precision regarding a shape or dimensions for the roller body 16 as the cylindrical hollow pipe. Accordingly, it can prevent transport irregularity caused by deformation of the roller body 16. That is, in the metal sheet which serves as the substrate for forming the roller body 16, the end of one side constituting the second straight portion 83*b* becomes a convex portion 88 of which the pair of adjacent intersection portions 82 and 82 and the second straight portion 83*b* connecting the ends thereof form an outer shape of the convex portion.

Figure 9A:
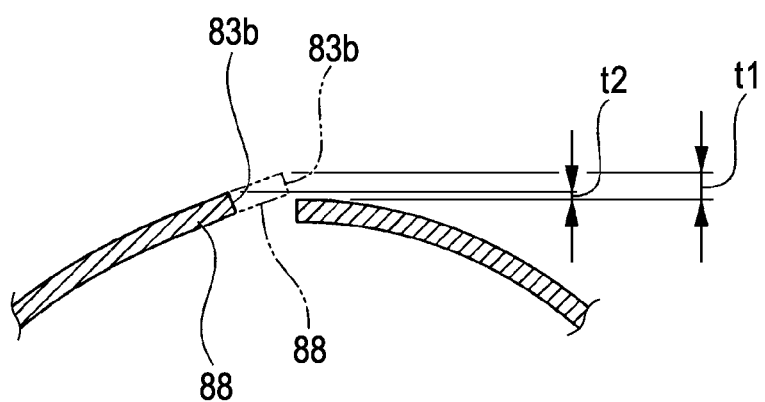
FIG. 9A is a cross-sectional view of the joint.

As a result, when the convex portion 88 is placed near the opposite end by pressing the metal sheet, as shown by a chain double-dashed line in FIG. 9A, a leading end side of the convex portion 88 is not sufficiently bent in a circumferential shape, so that it ascends by a dimension t1 with respect to the opposite end. As a result, a stepped portion is formed on the second straight portion 83*b*. Due to the stepped portion, the obtained roller body 16 is likely to deform, and the appropriate precision regarding the shape or the dimensions can be hard to obtain.

Consequently, the distance d3 between the ends of the second straight portion 83*b* is set to be longer than the distance d4 between the ends of the first straight portion 83*a* which is formed to be longer than the second straight portion 83*b*. As a result, a dimension t2 corresponding to that the leading end of the convex portion 88 ascends outwardly, as shown by a solid line in FIG. 9A, is shortened in comparison with the distance t1, thereby suppressing the stepped portion from being formed on the second straight portion 83*b*.

Further, FIG. 9A shows the dimension t2 in an exaggerated manner for convenient comprehension, but the dimension t2 is close to zero in fact, so that a substantial stepped portion is disappeared. That is, by suppressing the stepped portion from being formed on the second straight portion 83*b*, as described above, it is possible to suppress the deformation of the roller body 16 caused by the stepped portion, thereby increasing the precision regarding the shape or the dimensions.

Figure 9B:
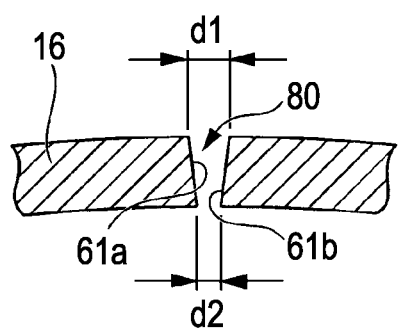
FIG. 9B is an enlarged cross-sectional view of the joint.

In the joint 80 constituted by the bent portion 81, since the outer circumference and the inner circumference of the metal plate 60 have the same dimension (the width), in particular, at the first short straight portion 83*a*, the distance between the pair of ends (the end faces) 61*a* and 61*b* is relatively wide at the outer circumferential side of the roller body 16, and is relatively narrow at the inner circumferential side, as shown in FIG. 9B.

That is, the distance d1 between the pair of ends 61*a* and 61*b* at the outer circumferential side of the roller body 16 is larger than the distance d2 at the inner circumferential side. More specifically, in this embodiment, the distance d1 (=d4) at the outer circumferential side is approximately 20 μm, and the distance d2 at the inner circumferential side is approximately 8 μm.

In the second straight portion 83*b* in which the distance between the pair of ends (the end faces) 61*a* and 61*b* is longer than the first straight portion 83*a*, the distance d1 (=d3) at the outer circumferential side is approximately 30 μm, and the distance d2 at the inner circumferential side is approximately 10 μm.

If the roller body 16 of the cylindrical shaft according to the invention is formed, the high-frictional layer 50 is formed on the surface of the roller body 16, as shown in FIG. 3.

A dry method and a wet method (or a combination method thereof) may be employed as a method for forming the high-frictional layer 50, but the dry method is preferably used in this embodiment. More specifically, first, resin particles and inorganic particles are prepared as a forming material of the high-frictional layer 50. The resin particle is made of an epoxy-based resin or polyester-based resin, and a particulate having a diameter of approximately 10 μm is preferably used.

Further, ceramic particles, such as aluminum oxide (alumina; $Al_2O_3$), silicon carbide (SiC) or silicon dioxide ($SiO_2$) is preferably used as the inorganic particle. Among them, since the alumina exercises a function of relatively increasing hardness and friction resistance, and is relatively inexpensive not to interfere with the reduction in cost, the alumina is preferably used. Consequently, the alumina particles are used as the inorganic particle in this embodiment.

The alumina particles adjusted in distribution of a predetermined grain size by crushing treatment may be used. The alumina particles are manufactured by the crushing treatment, the alumina particle has a relatively sharpened and pointed end, and the sharpened and pointed end leads the high frictional force to exercise.

Further, in this embodiment, the used alumina particle is adjusted in such a way that a grain size is in the range of 15 μm and 90 μm and a weighted average grain size (average grain size) of a center diameter is 45 μm.

That is, in the invention, the alumina particle (the inorganic particle), of which its average grain size (the center diameter) is larger than the distance d1 (30 μm) at the outer circumferential side of the above-described joint 80, is used. In particular, it is preferable that the alumina particles include particles having distribution of grain size (range of particle size) which is smaller than the distance d1 at the outer circumferential side of the joint 80 and is larger than the distance d2 (10 μm) at the inner circumferential side. Moreover, it is preferable that the minimum grain size in the distribution of the grain size is larger than the shortest distance between the pair of ends 61*a* and 61*b* in the joint 80, for example, the distance d2 at the inner circumferential side.

When the resin particles and the inorganic particles are prepared, first, the resin particles are applied on the roller body 16. That is, the roller body 16 is disposed in the painting booth (not shown), and the roller body 16 is applied with negative (minus) electric potential in the state of elemental substances.

Next, the resin particles are sprayed (ejected) toward the roller body 16 by using a tribo-charging gun of an electrostatic coating apparatus (not shown), and at that time, the sprayed particles (the resin particles) are charged with positive (plus) high electric potential. Thus, the charged resin particles are absorbed on the outer surface of the roller body 16 to form a resin film.

Figure 10A:
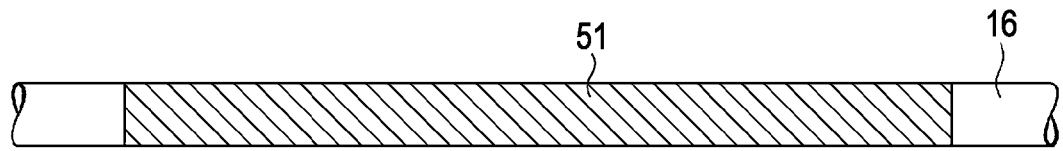
FIGS. 10A to 10C are views showing a process of forming a high-frictional layer on the roller body.

The formation of the resin film by the spraying of the resin particles corresponds to a formation region of the high-frictional layer 50 shown in FIG. 3. That is, for example, by masking both ends of the roller body 16 with a tape or the like, without performing the entire length of the roller body 16, only the center portion is performed except for both ends, as shown in FIG. 10A. That is, the resin film 51 is selectively formed only on a region corresponding to the center portion of the region, which at least abuts against the paper (medium) P to be transported, of the transport roller 15 constituted by the roller body 16.

In this instance, the joint 80 is not shown in FIG. 10A and FIGS. 10B and 10C which will be described below.

Weak static electricity of approximately +0.5 KV remains on the resin film 51 after the spray coating. In the spray coating, the roller body 16 is rotated around a shaft, so that the resin film 51 is formed at uniform thickness on the entire circumference thereof. The resin film 51 is formed to have a film thickness of, for example, 10 μm to 30 μm in consideration of the grain size of the above-described alumina particle. The film thickness can be appropriately adjusted depending upon a spraying amount and spraying time of the resin particles.

Figure 11:
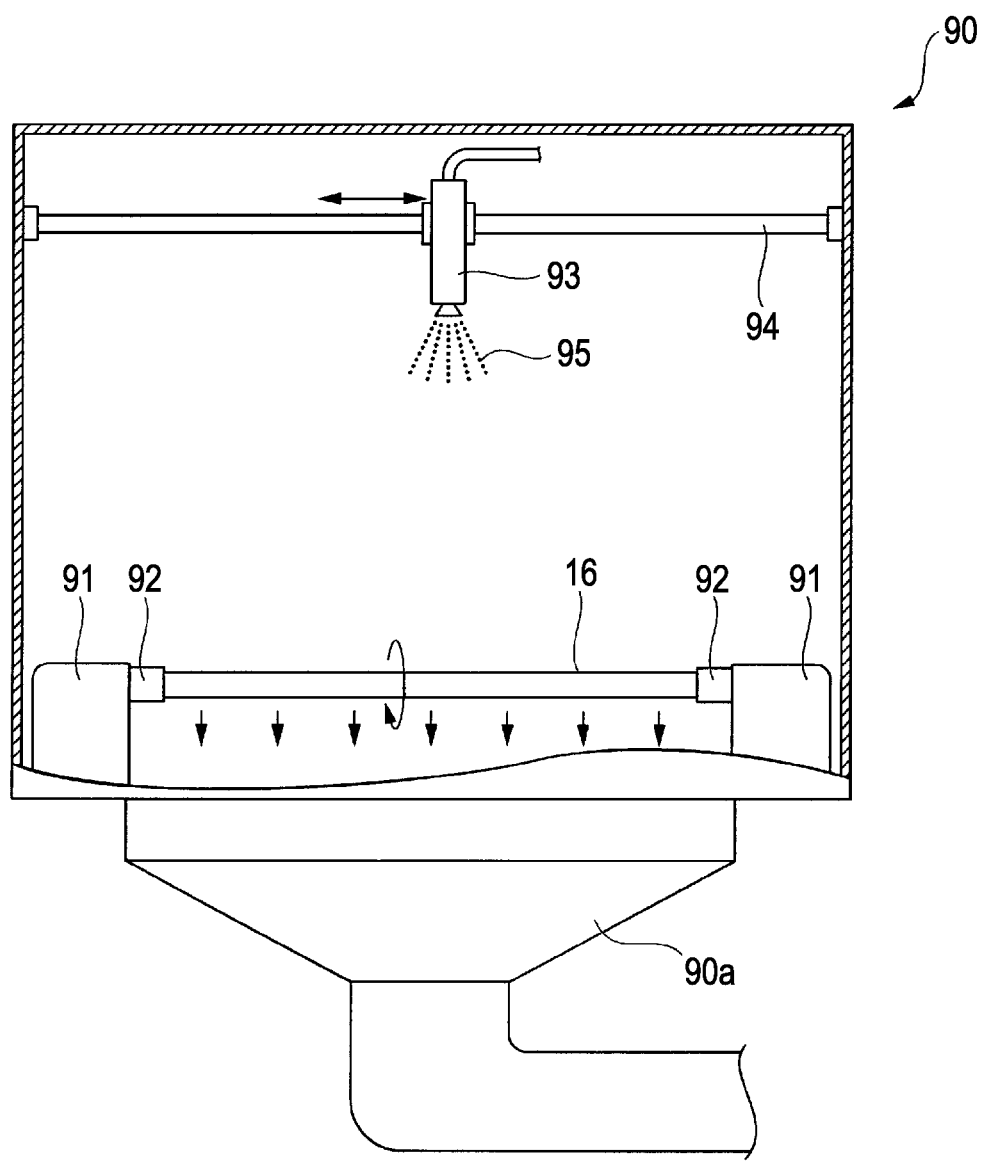
FIG. 11 is a schematic view of a paint booth for forming the high-frictional layer.
Figure 12:
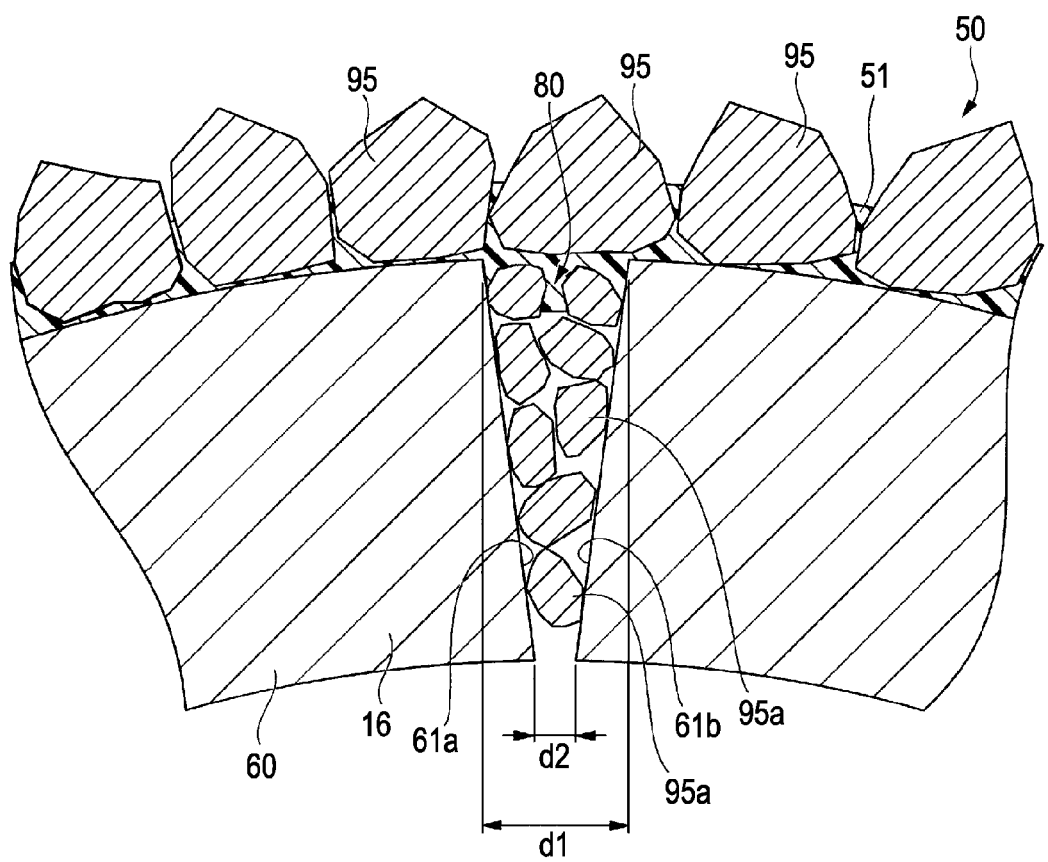
FIG. 12 is an enlarged view of the essential parts for the joint of the roller body and its periphery.

Next, the roller body 16 formed with the resin film 51 is drawn out the above-described painting booth, and is transferred to other painting booth 90 shown in FIG. 11 by a handling robot (not shown). The painting booth 90 is provided with a pair of rotation driving members 91 and 91 at the lower portion thereof. The rotation driving members 91 and 91 are provided with a chuck 92 for supporting the roller body 16 in a substantially horizontal direction.

Both ends of the roller body 16 are supported and fixed to the chucks 92 and 92, and the chucks 92 and 92 are rotated by the rotation driving members 91. As a result, the roller body 16 is slowly rotated around its shaft at low speed of, for example, approximately 100 rpm to approximately 500 rpm. In this instance, the roller body 16 may be supported at a bit askew.

Further, a corona gun 93 is disposed on the upper portion of the painting booth 90. The corona gun 93 is moved on the shaft 94 in right and left directions in FIG. 11. Also, the painting booth 90 is provided with an exhaust mechanism 90a at the lower portion thereof. Consequently, a slow air steam proceeding to the lower portion is formed in the painting booth 90. In this instance, a suction air volume of the exhaust mechanism 94 is appropriately set.

With this configuration, by spraying the above-described alumina particles 95 from the corona gun 93 while the roller body 16 is rotated around its shaft, the alumina particles 95 are selectively electrostatically absorbed on the resin film 51 formed on the roller body 16. In order to selectively electrostatically absorb the alumina particles on the resin film 51, both ends of the roller body 16 is masked with the tape or the like, at the same time of formation of the resin film 51.

At the time of electrostatic coating, the electric potential of the surfaces of the chuck 92 and the rotation driving member 91 is set to be substantially equal to the electric potential of the roller body 16, and the electric potential of the inner surface of the painting booth 90 is set to be electrically neutralized, that is, to be substantially zero. The reason is that the alumina particles 95 from the corona gun 93 are not absorbed on the portion other than the roller body 16. In order to electrically neutralize the electric potential of the inner surface of the painting booth 90, it is preferable that the painting booth 90 is manufactured by using a steel sheet having inner surface electric resistance of approximately 1011 Ω.

The electric potential applied to the corona gun 93 is set to be 0 V, and pressure of air to be supplied to the corona gun 93 is set to be low, for example, approximately 0.2 Mpa. Then, the alumina particles 95 of approximate zero electric potential are sprayed from the upper portion while the corona gun 93 is moved in right and left directions in FIG. 10, and thus the alumina particles 95 are free dropped in a vertical direction by its own weight.

As described above, since imperceptible static electricity (approximately +0.5 KV) remains in the resin film 51 formed the roller body 16 by the electrostatic coating, the alumina particles 95 are electrostatically absorbed on the entire circumference of the resin film 51 with substantially uniform by this static electricity. The alumina particles 95 electrostatically absorbed by the above way abut on the surface of the resin film 51, and then the resin film 51 is adhered to the outer circumference of the roller body 16 by a binder, in the state of partially entering into the outer circumference.

Here, in this embodiment, since the electric potential in the inner surface of the painting booth 90 is electrically neutralized to approximately zero and the air stream which flows downwardly is formed in the painting booth 90, the alumina particles 95 are freely dropped downwardly in a vertical direction by its one weight. Below the drop direction, since the horizontally supported roller body 16 is slowly rotated around its shaft, the alumina particles 95 are substantially uniformly sprayed on the outer circumference of the roller body 16.

Figure 10B:
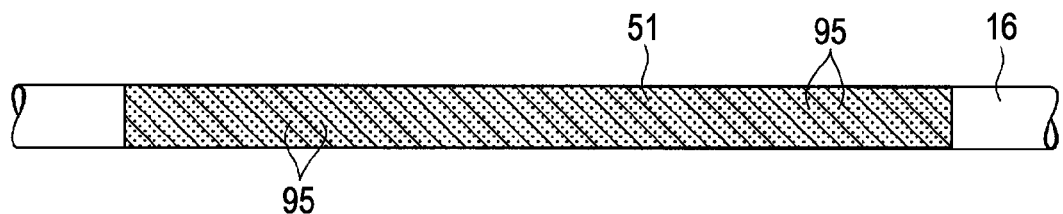
Figure 10C:
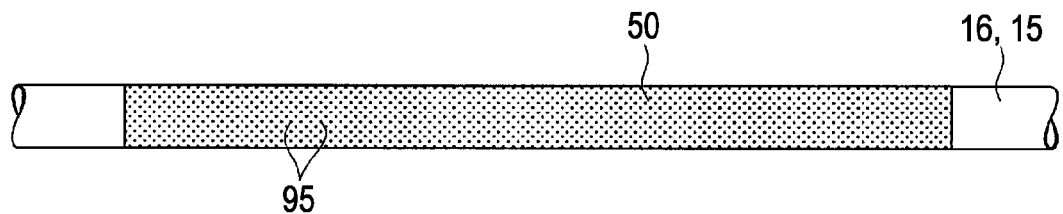

Consequently, the alumina particles 95 are uniformly adhered to the surface of the resin film 51 which is not particularly masked, and thus the alumina particles (inorganic particles) 95 are dispersed and exposed on the center portion of the resin film 51 in the roller body 16, as shown in FIG. 10B. That is, when the alumina particles 95 abut on the resin film 51 by the electrostatic absorption power, a portion of the alumina particles 95 enters into the resin film 51, and the remaining portion protrudes from the surface of the resin film 51. In this instance, since the alumina particles 95 is likely to vertically stand on the surface of the roller body 16, the alumina particles 95 are uniformly distributed, and are adhered in the state in which most of sharpened and pointed ends (summit) face outwardly.

Consequently, the alumina particles 95 exercises the high frictional force due to the ends protruding from the surface of the resin film 51. Herein, in order to enable the alumina particles 95 to exercise the necessary and sufficient frictional force on the paper P, it is preferable that an occupied area of the alumina particles 95 is 20% to 80% of an area of the resin film 51.

In this instance, in application (spray) of the alumina particles 95, if the alumina particles 95 are slowly sprayed downwardly in a vertical direction, it is not limited to the application by the electrostatic coating method, and, for example, a coating (spray) method using a spray gun may be used.

If the alumina particles 95 are sprayed and adhered to the resin film 51 by the above way, the roller body 16 is heated by temperature of approximately 180° C. to approximately 300° C. during 20 minutes to 30 minutes, to fire and cure the resin film 51. Consequently, the alumina particles 95 are fixed to the roller body 16. In this way, as shown in FIG. 10C, the alumina particles (the inorganic particles) 95 are dispersed and exposed in the resin film 51 to form the high-frictional layer 50, thereby obtaining the transport roller 15 according to the invention.

While the application (spray) of the resin particles and the application (spray) of the alumina particles (the inorganic particles) are performed in separate painting booths, they can be performed in the same painting booth.

If the high-frictional layer 50 is formed by this way, the joint 80 particularly shown in FIGS. 7 and 8 is not provided with a groove due to the gap between the ends (the end faces) 61a and 61b of the metal sheet 60, and the gap between the ends 61a and 61b is mainly filled by the alumina particles 95.

That is, since the alumina particles 95 having an average grain size which is larger than the distance d1 at the outer circumferential side of the joint 80 are used, most of the alumina particles 95 do not enter in the inside of the joint 80, and are adhered to the outer circumference of the roller body 16 across the resin film 51, as shown in FIG. 11. Consequently, in spite of that the gap is formed between the ends 61a and 61b of the metal sheet 60 in the joint 80, the gap is covered with the alumina particles 95, so that the groove is not substantially formed due to the gap.

Further, since the alumina particles 95 include particles 95a having the distribution of the grain size (the range of particle size) which is smaller than the distance d1 at the outer circumferential side of the joint 80 and is larger than the distance d2 (10 μm) at the inner circumferential side, the particles 95a enter in the gap formed in the joint 80 and stay therein, so that the groove by the joint 80 is not surely formed.

In addition, even though force acts on the roller body 16 (the transport roller 15) in a direction to narrow the gap at the time of using, since the alumina particles 95a which enter in the roller body resist against the force, it is possible to suppress the deformation of the roller body 16 (the transport roller 15). Consequently, it is possible to prevent transport irregularity due to the deformation of the transport roller 15 in the transport roller mechanism 19 including the transport roller 15.

In the roller body (the cylindrical shaft) 16 constituting the transport roller 15, since the joint 80 formed between the pair of ends 61a and 61b is formed in such a way that the distance d3 between the pair of opposite ends at the second straight portion 83b is formed to be longer than the distance d4 between the pair of opposite ends at the first straight portion 83a, the precision regarding the shape or the dimensions of the cylindrical hollow pipe is further increased, as shown in FIG. 8.

That is, as shown by a solid line in FIG. 9A, a dimension t2 corresponding to that the leading end of the convex portion 88 forming the second straight portion 83 ascends outwardly is shortened (small) in comparison with the dimension t1, as shown by a chain double-dashed line in FIG. 9A, thereby suppressing the stepped portion from being formed on the second straight portion 83b.

By suppressing the stepped portion from being formed on the second straight portion 83b, it is possible to suppress the roller body 16 from being deformed due to the stepped portion, thereby increasing the precision regarding the shape or the dimensions.

In addition, since the first straight portion 83a and the second straight portion 83b are formed substantially in parallel with the center axis 16a of the roller body 16 in the bent portion 81, when the metal sheet 60 serving as the substrate is pressed, the pair of ends 61a and 61b which are opposite to each other over the entire length of the joint 80 can be placed near or abut on each other with high precision.

Also, since the intersection portion 82 in the bent portion 81 is extended in a direction substantially perpendicular to the center axis 16a of the roller body 16, when the metal sheet 60 is pressed, the opposite ends in the intersection portion 82 can be placed near or abut on each other with high precision.

With the transport roller 15 including the roller body 16 formed with the high-frictional layer 50, the roller body (the cylindrical shaft) 16 formed by pressing the metal sheet 60 in a cylindrical shape is used, thereby achieving the reduction in cost and weight as compared with the case of using a solid rod member. Further, the good transport power can be exercised by installing the high-frictional layer 50 containing the alumina particles 95 (the inorganic particles). Moreover, since the precision regarding the shape or dimensions of the roller body 16 are further increased, as described above, the transport irregularity due to the insufficient precision can be suppressed.

Further, both leading end sides of the roller body 16 (the transport roller 15) are portions for attaching a coupling member of a driving system such as a gear, and the portion directly abutting against the paper (recording medium) P becomes a center portion of the roller body 16. Consequently, in this embodiment, since the above-described high-frictional layer 50 is installed at the center portion except for both ends of the roller body 16, that is, the region abutting against the paper (medium) P, the material cost of the high-frictional layer 50 can be minimized, without deteriorating the transport performance of the paper P.

Second Embodiment of a Transport Roller 15

A Roller Body 16

Now, as the detailed description of the second embodiment of the transport roller 15 (the roller body 16), the detailed structure and a manufacturing method thereof will be described with reference to FIGS. 13 to 15.

In this instance, the same configuration and the manufacturing method as those in the first embodiment will be omitted or described in brief.

Figure 13A:
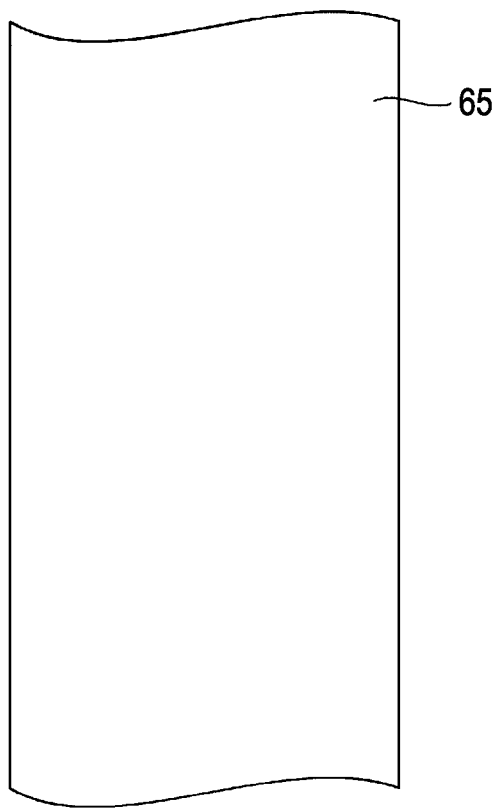
FIGS. 13A and 13B are plan views showing a metal plate serving as a substrate of a roller body according to a second embodiment.
Figure 13B:
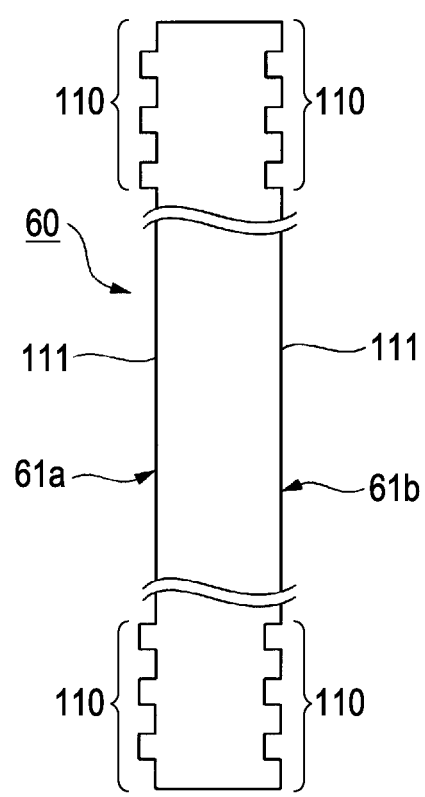

In order to manufacture the transport roller 15 according to the second embodiment, first, a large metal sheet (a first metal sheet) 65 of a rectangular plate shape or strap shape is prepared, as shown in FIG. 13A. Next, the large metal sheet 65 is cut by a pressing process to form a metal sheet (a second metal sheet) 60 in the shape of a substantially elongated rectangular plate corresponding to the size of the roller body 16, as shown in FIG. 13B, that is, the metal sheet 60 which serves as a substrate of the roller body 16.

However, when the large metal sheet 65 is subjected to the pressing process, in order to form a bent portion of a rectangular waveform at the above-described joint formed between the pair of ends at the same time of the above-described cutting operation, a concave-convex portion 110 of a rectangular waveform is formed at both ends, in the longitudinal direction, of the pair of opposite ends 61a and 61b which are long sides. Further, a straight portion 111 is formed between the concave-convex portions 110 formed at both ends in the respective long sides (the ends 61a and 61b), that is, the straight portion 111 is formed in the center portion.

Next, in similar to the first embodiment, as shown in the process view of pressing process of FIGS. 5A to 5C and 6A to 6C, the metal sheet 60 is pressed to have a cylindrical shape (a pipe shape), and the ends 61a and 61b of both sides (the long sides) are placed near or abut on each other.

Further, in similar to the first embodiment, in order to increase the circularity of the hollow pipe formed by pressing process (the roller body 16) and reduce the tremor, the outer circumference of the above-described hollow pipe (the roller body 16) is polished by a centerless polishing processing known in the art.

Figure 14A:
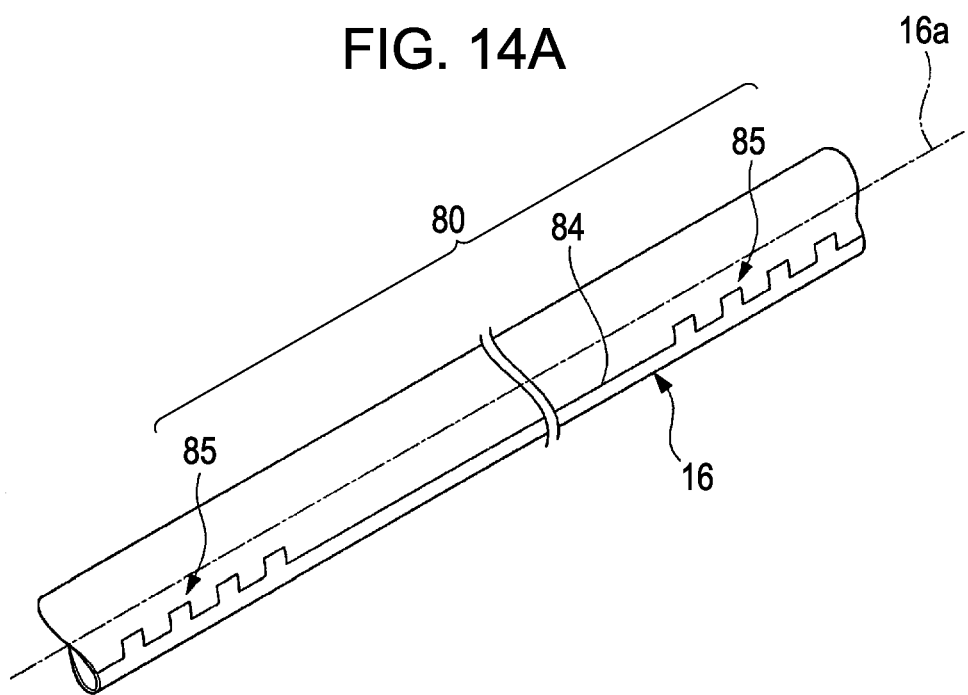
FIG. 14A is a perspective view of the roller body according to the second embodiment.

The joint 80 formed by this way is provided with both-end bent portions 85 of a rectangular waveform formed at both ends of the roller body 16, as shown in FIG. 14A, by fitting of the concave-convex portion 110 shown in FIG. 13B. Also, a center straight portion 84 is formed between the both-end bent portions 85 by placing the straight portions 111 shown in FIG. 13B near each other. The center straight portion 84 containing a region corresponding to a high-frictional layer which will be described, that is, a region forming the high-frictional layer is formed.

Figure 14B:
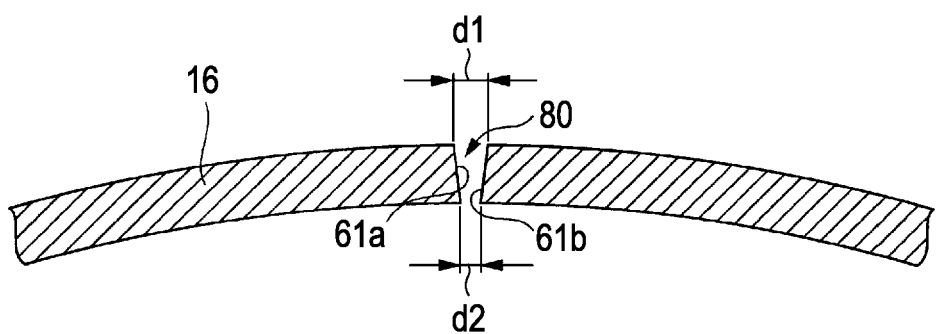
FIG. 14B is a cross-sectional view of a joint.

In the joint 80, since the outer circumference and the inner circumference of the above-described metal plate 60 have the same dimension (the width), for example, the distance between the pair of ends (the end faces) 61a and 61b at the center straight portion 84, as shown in FIG. 14B, is relatively wide at the outer circumferential side of the roller body 16, and is relatively narrow at the inner circumferential side.

That is, the distance d1 between the pair of ends 61a and 61b at the outer circumferential side of the roller body 16 is larger than the distance d2 at the inner circumferential side. More specifically, in this embodiment, the distance d1 at the outer circumferential side is approximately 30 μm, and the distance d2 at the inner circumferential side is approximately 10 μm.

Figure 15A:
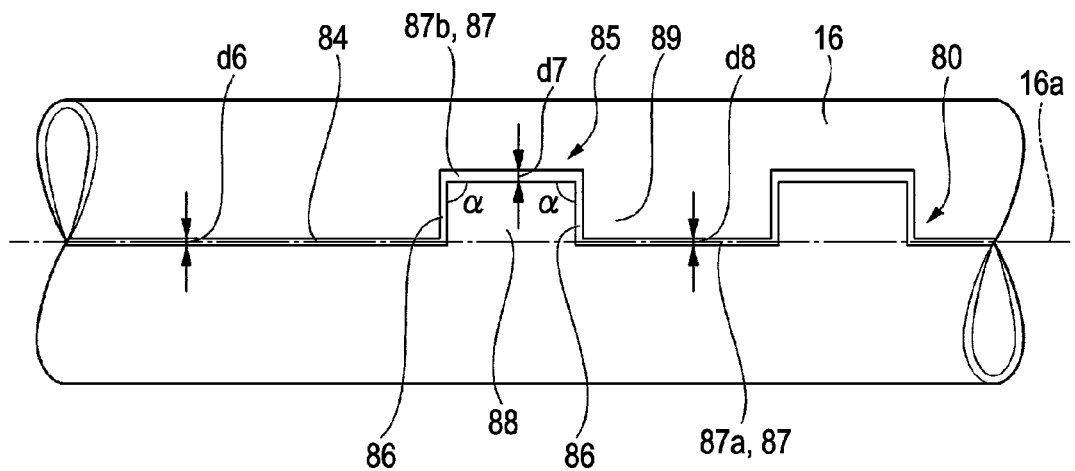
FIG. 15A is a view illustrating the shape of the joint of the roller body according to the second embodiment.

Further, as shown in FIG. 15A, the both-end bent portion 85 is constituted by a connecting straight portion (a first straight portion 87a and a second straight portion 87b) which is substantially in parallel with the center axis 16a of the roller body 16, and an intersection portion 86 of a straight shape which is perpendicular to the connecting straight portion and thus is substantially perpendicular to the center axis 16a.

That is, the both-end bent portion 85 formed at both ends of the joint 80 is constituted by the plurality of intersection portions 86 of a straight shape, the first straight portion 87a connecting one side ends of the intersection portions 86, and the second straight portion 87b connecting the other side ends.

Here, the first straight portion 87a of the connecting straight portion 87 is formed on the same straight line as the center straight portion 84. Further, the first straight portion 87a is formed to be longer than the second straight portion 87b of the connecting straight portion 87 at the other side.

In this embodiment, in both-side bent portion 85, a distance d7 between a pair of opposite ends of the second straight portion 87b which serve as leading ends of the convex portion 88 formed by the pair of intersection portions 86 and 86 and the second straight portion 87b is formed to be longer than a distance d6 (=d1) between a pair of opposite ends at the center straight portion 84.

Further, the distance d7 between the pair of ends of the second straight portion 87b is formed to be longer than a distance d8 between the pair of opposite ends at the first straight portion 87a. Here, it is preferable that the distance d8 between the ends at the first straight portion 87a is formed to be equal to or longer than the distance d6 between the ends at the center straight portion 84.

In this instance, the distances d6, d7 and d8 between the pair of ends are the distance between the ends at the gap formed on the outer circumference of the roller body 16.

More specifically, in this embodiment, the distance d6 (=d1) of the center straight portion 84 is 30 μm, as described above, while the distance d7 of the second straight portion 87b is more than 30 μm, for example, more than 40 μm.

Since the distance d7 is formed to be longer than the distance d6 (=d1), the precision regarding the shape or dimensions of the roller body (the cylindrical shaft) 16 as the cylindrical hollow pipe is further increased.

That is, with the metal sheet 60 serving as a substrate for forming the roller body 16, one end of one side constituting the second straight portion 87b becomes a convex portion 88 that forms an external appearance of the second straight portion 87b connecting the pair of adjacent intersection portions 86 and 86 and the ends thereof. Accordingly, when the metal sheet 60 is pressed to place the convex portion 88 near the opposite end, as shown by a chain double-dashed line in FIG. 15B, a leading end side of the convex portion 88 is not sufficiently bent in a circumferential shape, so that it ascends by a dimension t1 with respect to the opposite end. As a result, a stepped portion is formed on the second straight portion 87b. Due to the stepped portion, the obtained roller body 16 is likely to deform, and the appropriate precision regarding the shape or the dimensions can be hard to obtain.

Figure 15B:
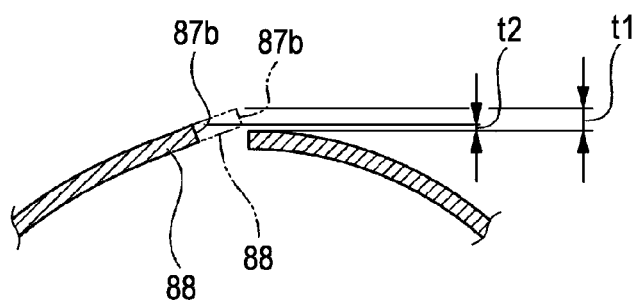
FIG. 15B is a cross-sectional view of the joint.

Consequently, the distance d7 between the ends of the second straight portion 87b is set to be longer than the distance d6 between the ends of the center straight portion 84 which is formed to be longer than the second straight portion 87b. As a result, a dimension t2 corresponding to that the leading end of the convex portion 88 ascends outwardly, as shown by a solid line in FIG. 15B, is shortened (small) in comparison with the above-described distance t1. Consequently, it is possible to suppress the stepped portion from being formed on the second straight portion 87b.

In this instance, FIG. 15B shows the dimension t2 in an exaggerated manner for convenient comprehension, but the dimension t2 is close to zero in fact, so that a substantial stepped portion is disappeared. That is, by suppressing the stepped portion from being formed on the second straight portion 87b, as described above, it is possible to suppress the deformation of the roller body 16 caused by the stepped portion, thereby increasing the precision regarding the shape or the dimensions.

Further, in the case in which a distance d8 between the ends of the first straight portion 87a is equal to the distance d6 between the ends of the center straight portion 84 in the metal sheet 60, it is possible to align both side ends constituting the first straight portions 87a and both ends constituting the center straight portion 84 with the same line, respectively. Consequently, the metal sheet 60 can be easily pressed.

As a result, the precision regarding the shape or the dimensions for the obtained roller body 16 is increased by the configuration as described above, thereby suppressing deformation thereof or the like.

Meanwhile, in the case in which the distance d8 between the ends of the first straight portion 87a is formed to be longer than the distance d6 between the ends of the center straight portion 84, similar to the case explained in FIG. 15B, the dimension corresponding to that the leading end side of the convex portion 89 which is the leading end of the first straight portion 87a ascends outwardly is shortened (small). Therefore, it is possible to suppress the stepped portion from being formed on the first straight portion 87a.

If the roller body 16 of the cylindrical shaft is formed, similar to the first embodiment, the high-frictional layer 50 is formed on the surface of the roller body 16, as shown in FIG. 3.

The formation of the resin film by the spraying of the resin particles corresponds to a formation region of the high-frictional layer 50 shown in FIG. 3, and, as shown in FIG. 9A, only the center portion is performed except for the both-end bent portions 85 (both ends). That is, the resin film 51 is selectively formed only on a region corresponding to the center portion of the region, which at least abuts against the paper (medium) P to be transported, of the transport roller 15 constituted by the roller body 16, that is, the center straight portion 84.

With the roller body (the cylindrical shaft) 16 constituting the transport roller 15, since the joint 80 formed between the pair of ends 61a and 61b is provided with the center straight portion 84 formed in the straight shape and the both-end bent portions 85 formed at both ends of the center straight portion 84, as shown in FIG. 14A, there is no fitting of a concave portion and a convex portion at the center straight portion 84. For this reason, as compared with the case in which a fitting portion by the concave portion and the convex portion is formed over the entire length of the joint 80, the deformation or distortion hardly occur on the roller body 16, thereby easily obtaining the high precision regarding the shape or the dimensions, such as circularity or tremor.

Further, as shown in FIG. 15A, in the roller body (the cylindrical shaft) 16 at both-end bent portion 85, since the distance d7 between the pair of opposite ends at the second straight portion 87b is formed to be longer than the distance d6 between the pair of opposite ends at the center straight portion 84, the precision regarding the shape or the dimensions for the cylindrical hollow pipe is further increased.

That is, as shown by a solid line in FIG. 15B, a dimension t2 corresponding to that the leading end of the convex portion 88 forming the second straight portion 87b ascends outwardly can be shortened (small) in comparison with the distance t1, as shown by a chain double-dashed line in FIG. 15B. This can suppress the stepped portion from being formed on the second straight portion 87b.

By suppressing the stepped portion from being formed on the second straight portion 87b, it is possible to suppress the roller body 16 from being deformed due to the stepped portion, thereby increasing the precision regarding the shape or the dimensions.

In addition, the connecting straight portions 87 (the first straight portion 87a and the second straight portion 87b) at the both-end bent portions 85 are formed substantially in parallel with the center axis 16a of the roller body 16. These connecting straight portions 87 are substantially parallel with the center straight portion 84. When the metal sheet 60 serving as the substrate is pressed, the pair of ends 61a and 61b which are opposite to each other over the entire length of the joint 80 can be placed near or abut on each other with relatively high precision.

Further, since the first straight portion 87a at the above-described connecting straight portion 87 is formed on the same straight line as the center straight portion 84, when the metal sheet 60 is pressed, the pair of ends which are opposite to each other over the entire length of the joint 80 can be placed near or abut on each other with relatively high precision.

Moreover, since the first straight portion 87a at the connecting straight portion 87 is formed to be longer than the second straight portion 87b of the other side, when the metal sheet 60 is pressed, the pair of ends which are opposite to each other over the entire length of the joint 80 can be placed near each or abut on other with relatively high precision.

In addition, since the distance d7 between the opposite ends of the second straight portion 87b of the connecting straight portion 87 is formed to be longer than the distance d8 between the ends of the first straight portion 87a, in particular, in the case in which the distance d8 between the ends of the first straight portion 87a is equal to or longer than the distance d6 between the ends of the center straight portion 84, it is possible to suppress the roller body 16 obtained as described above from being deformed, in any cases.

Also, since the intersection portion 86 in the both-end bent portion 85 is extended in a direction substantially perpendicular to the center axis 16a of the roller body 16, when the metal sheet 60 is pressed, the opposite ends in the intersection portion 86 can be placed near or abut on each other with relatively high precision.

The roller body 16 (the transport roller 15) according to the second embodiment employs the roller body (the cylindrical shaft) 16 formed by pressing the metal sheet 60 in a cylindrical shape, similar to the first embodiment, thereby achieving the reduction in cost and weight as compared with the case of using a solid rod member. Further, the good transport power can be exercised by installing the high-frictional layer 50 containing the alumina particles 95 (the inorganic particles). Moreover, since the precision regarding the shape or dimensions of the roller body 16 are further increased, as described above, the transport irregularity due to the insufficient precision can be suppressed.

Further, both leading end sides of the roller body 16 (the transport roller 15) become portions for attaching a coupling member of a driving system such as a gear, and the portion directly abutting against the paper (recording medium) P becomes a center portion of the roller body 16. Consequently, in this embodiment, since the above-described high-frictional layer 50 is installed at the center straight portion 84 except for both-end bent portion 85 of the roller body 16, that is, the region abutting against the paper (medium) P, the material cost of the high-frictional layer 50 can be minimized, without deteriorating the transport performance of the paper P.

Now, the engaging portions formed at both leading end sides of the roller body 16 (the transport roller 15) according to the first and second embodiments will be described with reference to FIGS. 16A to 20.

The engaging portion for connecting various coupling members, such as a transport driving gear 35 or an inner gear 39 which are shown in FIG. 2, may be provided to one or both of both leading end sides of the roller body 16 (the transport roller 15).

Figure 16A:
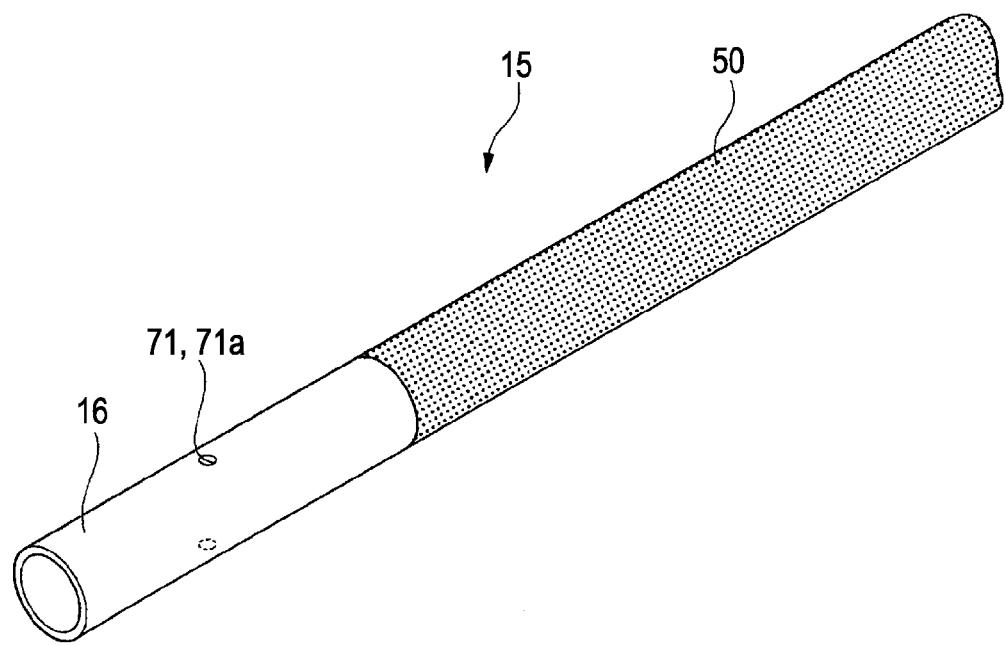
FIG. 16A is a perspective view of the essential parts for the roller body.
Figure 16B:
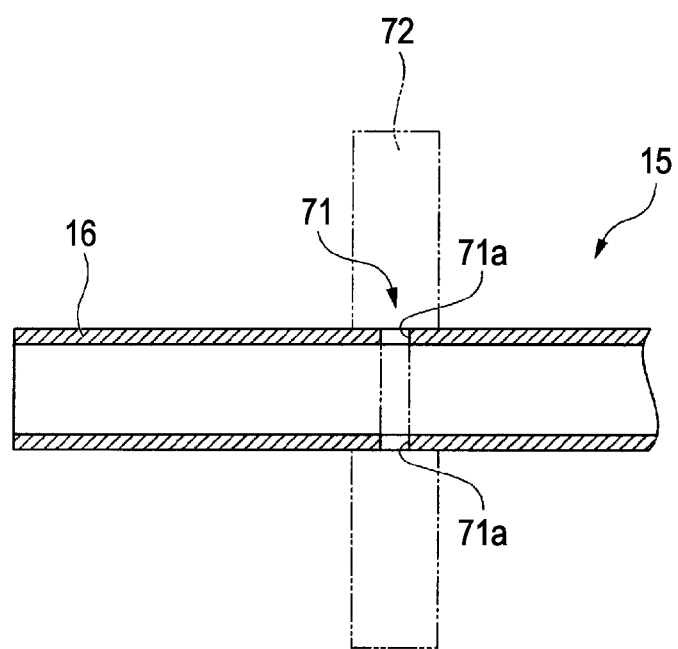
FIG. 16B is a cross-sectional view.

For example, as shown in FIG. 16A and FIG. 16B, the roller body 16 made of the cylindrical pipe (the hollow pipe) is provided with through-holes 71a and 71a at opposite positions thereof, that is, two forming surfaces defining a diameter of the roller body 16. An engaging hole (the engaging portion) 71 having the pair of through-holes 71a and 71a is formed. With the engaging hole 71, the coupling member 72 such as a gear can be fixed by a shaft or pin (not shown).

Figure 17A:
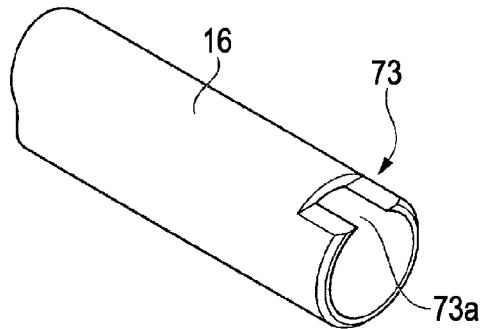
FIG. 17A is a perspective view of the essential parts for the roller body.
Figure 17B:
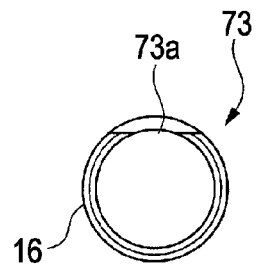
FIG. 17B is a side elevational view.

Further, as shown in FIGS. 17A and 17B, the end of the roller body 16 may be provided with an engaging portion 73 of a D-type cut shape. The engaging portion 73 is formed at the end of the cylindrical hollow pipe (the roller body 16), and, as shown in FIG. 17A, a portion of the hollow pipe is cut in the rectangular shape to form an opening 73a, as shown viewed from a plane. In this way, the external appearance of the end side is formed in the apparent D-shape, as shown in FIG. 17B.

Therefore, the coupling member (not shown) such as a gear can be attached to the roller body 16 (the transport roller 15) by fitting the coupling member to the engaging portion 73 formed in the apparent D-shape, without idling the coupling member. Further, the engaging portion 73 is provided with an opening 73a of a groove shape, in which the opening communicates with an inner bore of the hollow pipe (the roller body 16), so that the coupling member can be attached to the roller body 16 by using the opening 73a, without idling the coupling member. More specifically, the coupling member is formed with the convex portion, and the convex portion is fitted to the above-described opening 73a, thereby preventing the idling.

Figure 18A:
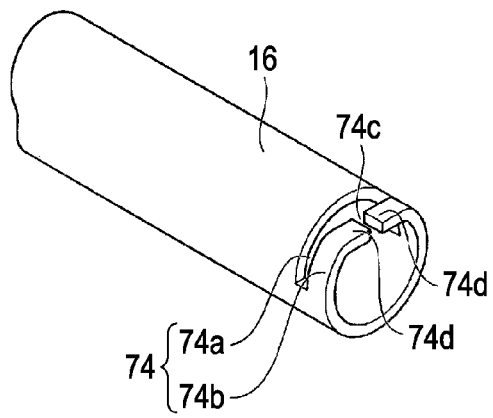
FIG. 18A is a perspective view of the essential parts for the roller body.
Figure 18B:
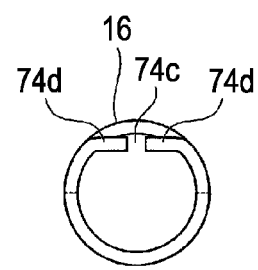
FIG. 18B is a side elevational view.

In addition, as shown in FIGS. 18A and 18B, the end of the roller body 16 may be provided with an engaging portion 74 having a groove 74a and the D-shaped cut portion 74b. In the engaging portion 74, the D-shaped cut portion 74b is formed at an outer end portion of the roller body 16, and the groove 74a is formed farther at the inner side than the D-shaped cut portion 74b. The groove 74a is formed by cutting the roller body 16 in a circumferential direction to an approximately half degree, as shown in FIG. 18A.

The D-shaped cut portion 74b has an opening 74c extending on the outer side of the groove 74a in a direction perpendicular to the groove 74a, and a pair of bent sides 74d and 74d formed at both sides of the opening 74c. That is, as shown in FIG. 18B, the pair of the bent sides 74d and 74d are bent toward the center axis of the roller body 16, so that portions corresponding to the bent sides 74d and 74d are regressed from the circular circumference of the roller body 16.

Therefore, the coupling member (not shown) such as a gear can be attached to the roller body 16 (the transport roller 15) by fitting the coupling member to the above-described groove 74a or the D-shaped cut portion 74b, without idling the coupling member. Further, the engaging portion 74 is provided with the opening 74c formed between the bent portions 74d, so that the coupling member can be attached to the roller body 16 by using the opening 74c, without idling the coupling member. More specifically, the coupling member is formed with the convex portion, and the convex portion is fitted to the above-described opening 74c, thereby preventing the idling.

Figure 19A:
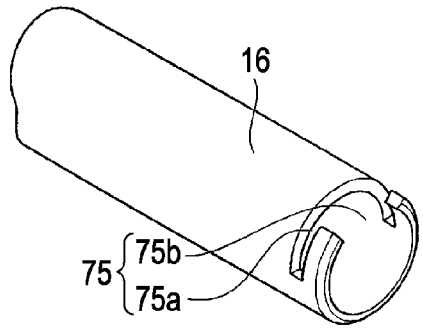
FIG. 19A is a perspective view of the essential parts for the roller body.
Figure 19B:
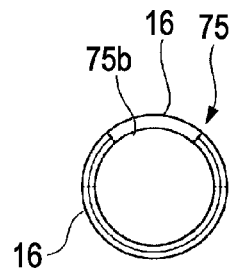
FIG. 19B is a side elevational view.

Further, as shown in FIGS. 19A and 19B, the end of the roller body 16 may be provided with an engaging portion 75 having a groove 75a and an opening 75b. In the engaging portion 75, the opening 75b is formed at the outer end of the roller body 16, and the groove 75a is formed farther at the inner side than the opening 75b. The groove 75a is formed by cutting the roller body 16 in a circumferential direction to an approximately half degree, as shown in FIG. 19A. The opening 75b is formed by cutting a portion of the roller body 16 from the outer side of the groove 75a in a rectangular shape, as shown viewed from a plane. In this way, the external appearance of the end side is formed in the apparent D-shape, as shown in FIG. 19B.

Therefore, the coupling member (not shown) such as a gear can be attached to the roller body 16 (the transport roller 15) by fitting the coupling member to the above-described groove 75a or the portion formed in the apparent D-shape by the opening 75b, without idling the coupling member. Further, the engaging portion 75 is provided with the opening 75b, similar to the engaging portion 73 shown in FIGS. 18A and 18B, so that the coupling member can be attached to the roller body 16 by using the opening 75b, without idling the coupling member.

In order to form the engaging hole 71 or the engaging portions 73, 74 and 75, the roller body 16 obtained by pressing the metal sheet 60 can be further cut. For example, the engaging portion 73 shown in FIGS. 18A and 18B can be provided with the opening 73a by cutting its ends, thereby forming the engaging portion 73 of the apparent D-shape. Further, as to the engaging hole 71 shown in FIGS. 17A and 17B, the roller body 16 is perforated, so that the pair of through-holes 71a and 71a can be appropriately opposite to each other.

However, when the roller body 16 is further machined, the efficiency in the cost or time is deteriorated by adding a separate machining process for forming the engaging portion only. Accordingly, it is preferable that before the roller body 16 is pressed, a deployment engaging portion serving as an engaging portion is formed on the metal sheet by separate pressing process, and then the engaging portion is simultaneously formed when the metal sheet is pressed to form the roller body 16.

More specifically, when the large metal sheet (the first metal sheet) 65 shown in FIGS. 4A and 13A is pressed as the metal sheet (the second metal sheet) 60 formed in an elongated rectangular plate shape and having the concave-convex portion 110, as shown in FIGS. 4B and 13B, the large metal sheet 65 is machined as the small metal plate 60, and simultaneously, the deployment engaging portion such as a cut shape, a boss shape, a hole shape or a groove shape is formed on the end of the obtained metal sheet 60 in the longitudinal direction of the long side, that is, the outer end of the bent portion 81 or the both-end bent portion 85.

Figure 20A:
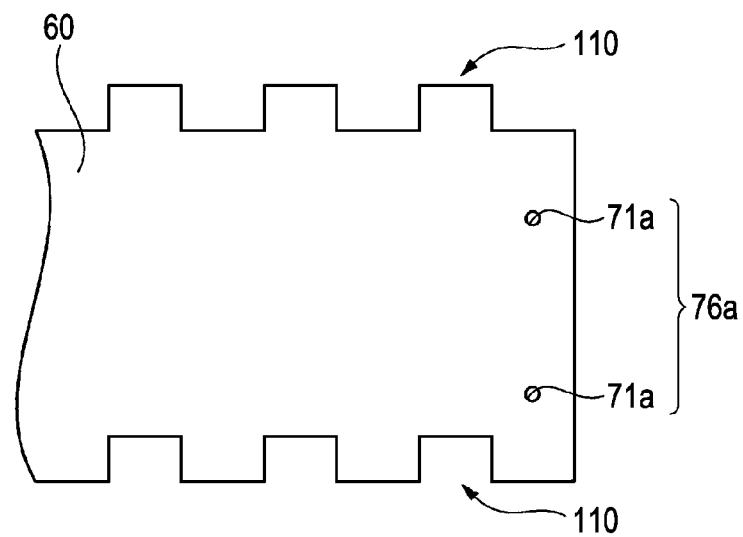
FIGS. 20A to 20C are plan views of the essential parts for a metal plate to illustrate a deployment engaging member.

For example, as shown in FIG. 20A, if the pair of through-holes 71a and 71a are machined at predetermined positions of the outer end of the concave-convex portion 110 of the metal sheet 60 to serve as the deployment engaging portion 76a, the metal sheet 60 may be pressed to form the engaging hole 71 shown in FIGS. 16A and 16B which are opposite to the pair of above-described through-holes 71a and 71a.

Figure 20B:
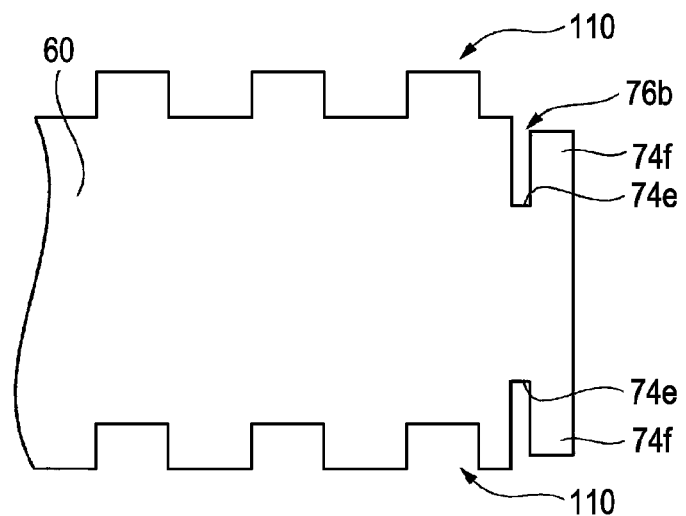

Further, as shown in FIG. 20B, if the outer end of the concave-convex portion 110 of the metal sheet 60 is cut in the predetermined shape to serve as the deployment engaging portion 76b, the metal sheet 60 may be pressed to form the engaging portion 74 shown in FIGS. 18A and 18B. That is, if a pair of cut portions (concave portions) 74e and 74e and a pair of protruding portions 74f and 74f are formed as the deployment engaging portion 76b, the engaging portion 74 may be formed. In this embodiment, however, since it is necessary to bend the pair of protruding portions 74f and 74f inwardly to form the bent portion 74d after the metal sheet 60 is pressed, it can be insufficient to sufficiently increase the efficiency in the cost or time in the machining process.

Figure 20C:
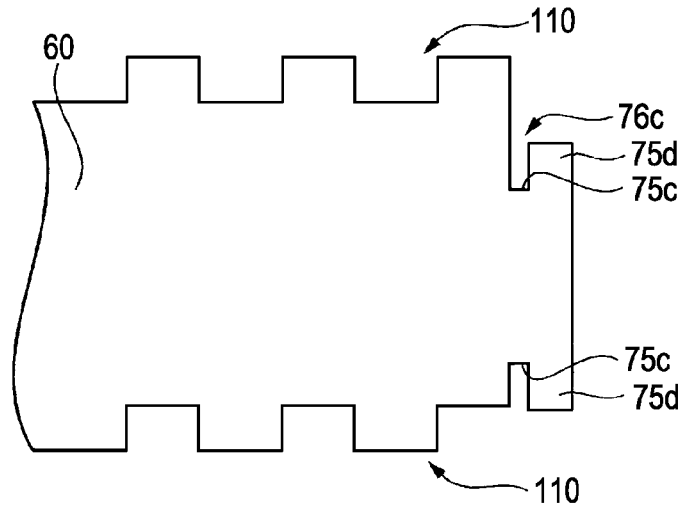

Accordingly, as shown in FIG. 20C, if the outer end of the concave-convex portion 110 of the metal sheet 60 is cut in the predetermined shape to serve as the deployment engaging portion 76c, the metal sheet 60 may be pressed to form the engaging portion 75 shown in FIGS. 19A and 19B. That is, if a pair of cut portions (concave portions) 75c and 75c and a pair of protruding portions 75d and 75d are formed as the deployment engaging portion 76c, the engaging portion 75 may be formed. In this embodiment, by bending the pair of protruding portions 75d and 75d in the shape of a circular arc when the metal sheet 60 is pressed, the opening 75b shown in FIG. 19B may be formed between the pair of protruding portions 75d and 75d. Accordingly, the roller body 16 formed by the pressing process is not necessary subjected to further machining, and thus it is possible to sufficiently increase the efficiency in the cost or time in the machining process.

Now, the operation of the ink jet printer 1 (the printing apparatus) including the above-described transport roller mechanism 19 will be described with reference to FIGS. 1 and 2.

If the paper P fed by the paper feed roller 13 reaches the neighborhood of the upstream side of the transport roller mechanism 19, the paper enters between transport roller 15 and the driven roller 17, and then is transported by driving of both rollers at constant speed toward the lower portion of the print head 21 which is positioned at the downstream side.

In this instance, since the transport roller 15 is formed with the high-frictional layer 50 and the driven roller 17 is disposed at a position which abuts on the high-frictional layer 50, the force pinching the paper P between the transport roller 15 and the driven roller 17 is increased, so that the transportability of the paper P is further enhanced.

In particular, since the transport roller 15 has no groove due to the joint 80 by using the alumina particles of a predetermined grain size at the time of formation of the high-frictional layer 50, it is possible to prevent the transport irregularity due to the groove. Further, since the roller body 16 is made with appropriate precision regarding the shape or the dimensions, this prevents the transport irregularity. Consequently, the transport roller mechanism 19 is adapted to perform the more accurate and stable paper feeding (transport).

If a print start end of the paper P reaches a predetermined print position just below the print head (the printing unit) 21, the printing starts.

After that, if the leading end of the paper P reaches the paper ejection roller mechanism 27, the paper ejection operation starts. In this instance, since the transport speed of the paper ejection roller mechanism 27 is set to be faster than that of the transport roller mechanism 19, the paper P is transported in the state in which back tension is applied to the paper. However, when the paper P is pinched by the transport roller mechanism 19 and the paper ejection roller mechanism 27, the paper transport speed is defined as the transport speed of the transport roller mechanism 19, as described above. Accordingly, when the ejection and the transport are simultaneously performed by the paper ejection roller mechanism 27 and the transport roller mechanism 19, the paper transport speed is defined as the transport speed of the transport roller mechanism 19, so that the accurate and stable paper feeding (transport) is performed without the transport irregularity.

As described above, the transport roller 15 employs the roller body (the cylindrical shaft) 16 formed by pressing the metal sheet 60 in a cylindrical shape, thereby achieving the reduction in cost and weight as compared with the case of using a solid rod member.

Further, the good transport power can be exercised by installing the high-frictional layer 50 containing the alumina particles 95 (the inorganic particles).

In addition, since the precision regarding the shape or dimensions of the roller body 16 are further increased, as described above, the transport irregularity due to the insufficient precision can be suppressed.

Moreover, since the high-frictional layer 50 is selectively installed at the center portion except for both ends of the roller body 16, that is, the region abutting directly the paper (recording medium) P, the material cost of the high-frictional layer 50 can be minimized, without deteriorating the transport performance of the paper P.

Further, with the roller body 16 according to the second embodiment, since the high-frictional layer 50 is installed at the region at least corresponding to the center straight portion 84, the material cost of the high-frictional layer 50 can be minimized.

However, the transport roller of the invention is not limited thereto, and, for example, the high-frictional layer 50 may be formed over the entire length of the roller body 16.

In addition, since the transport unit 10 of the embodiment further includes the transport roller 15 which can achieve the reduction in cost and weight and suppress the transport irregularity, the reduction in cost and weight of the transport unit itself can be achieved. Further, the transportability of the recording medium by the transport roller 15 becomes excellent.

Moreover, since the ink jet printer (the printing apparatus) 1 of the embodiment includes the above-described transport unit, the reduction in cost and weight is possible. Further, the recording medium can be properly transported.

In this instance, the invention is not limited to the above-described embodiments, and various modifications can be achieved in the range without deviating the gist of the invention.

For example, in the above-described embodiment, for the joint of the cylindrical shaft (the roller body) according to the invention, as shown in FIG. 8, the intersection portion 82 (86) in the bent portion 81 (the both-end bent portion 85) is formed to be perpendicular to the center axis of the roller body, but the invention is not limited thereto.

The intersection 82 (86) is not perpendicular to the center axis, and an angle α of the leading end side of the convex portion 88 formed by the pair of intersection portion 82 (86) and the second straight portion 83b (87b) in the bent portion 81 (the both-end bent portion 85) may be an obtuse angle (less than 180°). In this way, when the pair of ends 61a and 61b are placed near each other at the pressing process of the metal plate, the leading end of the convex portion 88 is easily fitted to the corresponding concave portion. Consequently, it is possible to suppress the roller body 16 from being deformed or distorted.

Further, the transport roller according to the invention is applied to the transport roller 15 in the transport roller mechanism 19 in the above-described embodiment, but the invention is not limited thereto.

It can be applied to the paper ejection roller 29 or the paper ejection knurled roller 31 in the paper ejection roller mechanism 27. Further, it can be applied to the driven roller 17 (the roller 17a) in the transport roller mechanism 19.

What is claimed is:
1. A transport roller comprising:
   a cylindrical shaft having a joint portion between end surfaces of a rolled plate defining the cylindrical shaft, the joint portion extending between one axial end of the cylindrical shaft and an opposite axial end of the cylindrical shaft, wherein the joint portion includes:
      a central linear section which is provided on a region of a center portion in an axis direction of the cylindrical shaft and is formed in a linear shape; and
      a projecting portion is provided outside of the region of the central linear section and extends in a direction cross-wise to the central linear section;
   wherein a medium to be transported by transport roller comes into contact with the region of the center portion;
   wherein end surfaces of the projection portion of the joint, at the edge portion in a direction of rotation of the transport roller, have a gap along an entire length of the edge portion in a direction along an axial direction of the transport roller,
   wherein the edge portion extends in an axial direction of the transport roller corresponding to a width of the projection portion;
   wherein a minimum distance between the end surfaces in the projecting portion of the joint at the edge portion in the direction of rotation of the transport roller is longer than a distance between the end surfaces in the central linear portion; and
   wherein the end surfaces in the projection portion are spaced apart from each other and the end surfaces in the central linear portion are spaced apart from each other.

2. The transport roller according to claim 1, wherein a first straight portion is formed on the same straight line as the central linear section.

3. The transport roller according to claim 2, wherein a second straight portion is formed on a straight line different from the central linear section.

4. The transport roller according to claim 3, wherein the joint is formed in such a way that a distance between a pair of opposite ends at the second straight portion is longer than the distance between the pair of opposite ends at the first straight portion.

5. The transport roller according to claim 1, wherein an intersection portion is extended in a direction substantially perpendicular to a center axis of the cylindrical shaft.

6. The transport roller according to claim 1, further comprising:
a high-frictional layer installed on a surface of the cylindrical shaft, and containing inorganic particles.

7. The transport roller according to claim 6, wherein the high-frictional layer is installed at least at a region which abuts against a medium transported by the transport roller.

8. The transport roller according to claim 1, further comprising:
a high-frictional layer installed on a surface of the cylindrical shaft, and containing inorganic particles,
in which the high-frictional layer is installed at least at a region corresponding to the central linear section.

9. A transport unit comprising:
the transport roller according to claim 6;
a driven roller that is driven by the transport roller; and
a driving device that rotatably drives the transport roller.

10. The transport unit according to claim 9, wherein a surface of the driven roller is subjected to a low-wear treatment.

11. The transport unit according to claim 9, wherein the driven roller is positioned at a position which abuts against the high-frictional layer of the transport roller.

12. A printing apparatus comprising:
the transport unit according to claim 9;
a printing unit that prints a recording medium transported by the transport unit; and
a control unit that controls the printing of the printing unit.

13. A transport roller comprising:
a cylindrical shaft having a joint portion between end surfaces of a rolled plate defining the cylindrical shaft, the joint portion extending between one axial end of the cylindrical shaft and an opposite axial end of the cylindrical shaft; and
a high-frictional layer installed on a surface of the cylindrical shaft, and containing inorganic particles;
wherein the joint portion includes:
a central linear section which is provided on a region of a center portion in an axis direction of the cylindrical shaft and is formed in a linear shape; and
a projecting portion is provided outside of the region of the central linear section and extends in a direction cross-wise to the central linear section;
wherein the central linear section is provided on a region of the center portion with which a medium to be transported by the transport roller comes into contact;
wherein end surfaces of the projection portion of the joint, at an edge portion in a direction of rotation of the transport roller, have a gap;
wherein the edge portion extends in a direction along an axial direction of the transport roller corresponding to a width of the projection portion;
wherein the gap is formed along an entire length of the edge portion;
wherein a minimum distance of the gap formed along the entire length of the edge portion is longer than a distance between the end surfaces in the central linear portion; and
wherein a part of the inorganic particles enter in the gap and stay therein.

14. A transport unit comprising:
the transport roller according to claim 13;
a driven roller that is driven by the transport roller; and
a driving device that rotatably drives the transport roller.

15. A printing apparatus comprising:
the transport unit according to claim 14;
a printing unit that prints a recording medium transported by the transport unit; and
a control unit that controls the printing of the printing unit.

16. A transport roller comprising:
a cylindrical shaft having a joint portion between end surfaces of a rolled plate defining the cylindrical shaft, the joint portion extending between one axial end of the cylindrical shaft and an opposite axial end of the cylindrical shaft; and
a high-frictional layer installed on a surface of the cylindrical shaft, and containing inorganic particles;
wherein the joint portion includes:
a central linear section which is provided on a region of a center portion in an axis direction of the cylindrical shaft and is formed in a linear shape; and
a projecting portion is provided outside of the region of the central linear section and extends in a direction cross-wise to the central linear section;
wherein the central linear section is provided on a region of the center portion with which a medium to be transported by the transport roller comes into contact;
wherein a distance of the end surfaces in the circumferential direction at an all over the projection portion of the joint is longer than a distance between the end surfaces in the central linear portion; and
wherein a part of the inorganic particles enter in a gap formed by the end surfaces in the circumferential direction at the projection portion of the joint and stay therein.

17. A transport unit comprising:
the transport roller according to claim 16,
a driven roller that is driven by the transport roller; and
a driving device that rotatably drives the transport roller.

18. A printing apparatus comprising:
the transport unit according to claim 17;
a printing unit that prints a recording medium transported by the transport unit; and
a control unit that controls the printing of the printing unit.

* * * * *